United States Patent
Tamer et al.

(10) Patent No.: US 6,542,909 B1
(45) Date of Patent: *Apr. 1, 2003

(54) SYSTEM FOR DETERMINING MAPPING OF LOGICAL OBJECTS IN A COMPUTER SYSTEM

(75) Inventors: Philip E. Tamer, Framingham, MA (US); Jane E. Hoffman, Medfield, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/108,038

(22) Filed: Jun. 30, 1998

(51) Int. Cl.$^7$ .............................................. G06F 17/30
(52) U.S. Cl. ..................... 707/205; 707/104.1; 711/162
(58) Field of Search .......................... 707/205, 1, 204, 707/202, 103, 100, 104.1, 203; 714/6, 20; 709/203; 711/112, 170, 167, 4, 165, 162, 114; 370/392, 414; 713/100

(56) References Cited

U.S. PATENT DOCUMENTS

| | | | |
|---|---|---|---|
| 4,835,684 A | 5/1989 | Kanai ........................... 712/42 |
| 4,908,795 A | 3/1990 | Tsuchiya et al. ........ 365/185.21 |
| 4,970,692 A | 11/1990 | Ali et al. ..................... 365/218 |
| 5,175,842 A | 12/1992 | Totani ......................... 395/425 |
| 5,249,279 A | 9/1993 | Schmenk et al. ........... 395/425 |
| 5,297,148 A | 3/1994 | Harari et al. .................. 371/10 |
| 5,359,569 A | 10/1994 | Fujita et al. ................. 365/229 |
| 5,379,212 A | 1/1995 | Sarner et al. ................. 705/12 |
| 5,465,337 A | 11/1995 | Kong ......................... 711/207 |
| 5,497,483 A | 3/1996 | Beardsley et al. .............. 714/1 |
| 5,553,307 A | 9/1996 | Fujii et al. ................... 395/845 |
| 5,559,954 A | 9/1996 | Sakoda et al. .............. 345/546 |

(List continued on next page.)

OTHER PUBLICATIONS

"Mastering Windows 95: The Windows 95 Bible," Chapter 12, Sysbase, 1995.*
U.S. patent application Ser. No. 09/107,923, Blumenau et al., filed Jun. 30, 1998.
U.S. patent application Ser. No. 09/107,684, Blumenau et al., filed Jun. 30, 1998.
U.S. patent application Ser. No. 09/107,613, Blumenau et al., filed Jun. 30, 1998.
U.S. patent application Ser. No. 09/107,538, Tamer et al., filed Jun. 30, 1998.

*Primary Examiner*—Charles Rones
(74) *Attorney, Agent, or Firm*—Wolf, Greenfield & Sacks, P.C.

(57) ABSTRACT

A method and apparatus for manipulating data in a storage device that is coupled to a host computer. Manipulations that can be performed by the storage device include moving non-contiguous blocks of data between the host computer and the storage device in a single operation. Other manipulations can be performed directly by the storage device without passing data to or from the host computer and include copying data from one logical object that is defined on the host computer to another, initializing, backing-up, transforming, or securely deleting a logical object that is defined by the host computer with a single command. In one embodiment, an application programming interface is provided that allows a relationship between logical objects on a host computer and storage locations on a storage device to be communicated between the host computer and the storage device. By providing the storage device with knowledge of the relationship between a logical object and the storage locations corresponding to that logical object, data corresponding to the logical object can be manipulated directly by the storage device, rather than by the host computer. In another embodiment, a graphical visualization routine is provided that displays the global mapping of a logical object to a set of physical blocks on the storage device for each layer of mapping below the logical object.

21 Claims, 13 Drawing Sheets

U.S. PATENT DOCUMENTS

| | | | |
|---|---|---|---|
| 5,596,707 A | 1/1997 | Ohta | 714/6 |
| 5,623,664 A | 4/1997 | Calvert | 713/1 |
| 5,664,161 A | 9/1997 | Fukushima et al. | 345/538 |
| 5,708,849 A | 1/1998 | Coke et al. | 710/22 |
| 5,765,216 A | 6/1998 | Weng et al. | 711/214 |
| 5,774,715 A | 6/1998 | Madany et al. | 707/101 |
| 5,802,547 A | 9/1998 | Legvold | 711/100 |
| 5,828,876 A * | 10/1998 | Fish et al. | 707/1 |
| 5,847,715 A | 12/1998 | Fujita et al. | 345/443 |
| 5,867,733 A | 2/1999 | Meyer | 710/74 |
| 5,887,151 A | 3/1999 | Raz | 712/206 |
| 5,898,891 A | 4/1999 | Meyer | 710/33 |
| 5,999,198 A | 12/1999 | Horan | 345/531 |
| 6,023,711 A * | 2/2000 | Bennett et al. | 707/205 |
| 6,035,412 A * | 3/2000 | Tamer et al. | 714/6 |
| 6,092,168 A | 7/2000 | Voigt | 711/170 |
| 6,105,118 A * | 8/2000 | Maddalozzo, Jr. et al. | 711/167 |
| 6,205,529 B1 | 3/2001 | Shagam | 711/170 |
| 6,240,022 B1 | 5/2001 | Sakui et al. | 365/185 |
| 6,256,642 B1 | 7/2001 | Krueger et al. | 707/205 |
| 6,269,381 B1 * | 7/2001 | St. Pierre et al. | 707/202 |
| 6,282,602 B1 * | 8/2001 | Blumenau et al. | 711/4 |
| 6,314,429 B1 * | 11/2001 | Simser | 707/103 |
| 6,314,503 B1 * | 11/2001 | DaErrico et al. | 711/165 |
| 6,329,985 B1 * | 12/2001 | Tamer et al. | 345/356 |
| 6,366,986 B1 * | 4/2002 | St. Pierre et al. | 711/162 |
| 6,385,626 B1 * | 5/2002 | Tamer et al. | 707/203 |
| 2001/0011348 A1 * | 8/2001 | Blummenau et al. | 713/100 |
| 2002/0019909 A1 * | 2/2002 | D'Errico | 711/114 |
| 2002/0091702 A1 * | 7/2002 | Mullins | 707/100 |

\* cited by examiner

| METADATA | |
|---|---|
| NAME: | file A |
| CREATED: | 10/15/97 |
| SIZE: | 514 |
| LOCATION: | D1, BLOCKS 1, 3 |
| PROTECTION: | RWED |
| • • • • | |

SYSTEM FOR DETERMINING MAPPING OF LOGICAL OBJECTS IN A COMPUTER SYSTEM

FIELD OF THE INVENTION

The present invention relates to data storage systems. More particularly, the present invention is directed to a method and apparatus for manipulating logical objects in a data storage system.

DESCRIPTION OF THE RELATED ART

Computer systems typically include one or more storage devices. FIG. 1 is a block diagram of such a typical computer system 100. The system 100 includes a host computer 110, having a processor 120 and a memory 130, and a storage system 140. The storage system 140 can be of any of a number of types (e.g., a tape storage device, a floppy diskette storage device, a disk storage device, etc.), or can include a combination of different types of storage devices.

Application programs executing on the processor 120 typically operate on data that is stored in the storage system 140. The data from the storage system 140 may be copied to the memory 130 for more efficient access by the host computer 110. When data in memory 130 is no longer needed by an application program, the processor 120 typically reads the data from memory 130 and writes the data to the storage system 140. Thus, application programs executing on the host computer 110 typically perform numerous reads from and writes to the storage system 140.

As discussed below, data stored in the storage device 140 is typically organized in units termed "blocks", where each block includes a number of bytes of data (e.g., 512 bytes). Application programs executing on the host computer 110 typically operate on logical objects (e.g., files) that include a collection of one or more blocks of data that are logically related. The computer system 100 typically includes one or more mapping layers that map from the logical objects operated upon by the application programs to the particular physical locations in the storage system where the blocks that make up the logical object are stored. Often, the blocks of data that make up a particular logical object are mapped to non-contiguous physical locations in the storage system 140. In a typical computer system 100, the storage system has no understanding that a number of non-contiguous physical blocks are logically related. Thus, when the host computer 110 executes an operation on a logical object having a plurality of blocks of data stored in non-contiguous physical locations in the storage device 140, the non-contiguous blocks must be accessed in separate operations from the storage system 140, which can impact the performance of the computer system 100.

FIG. 2 schematically represents a number of mapping layers on the computer system 100 of FIG. 1. Computer system 100 can be viewed as having a number of hierarchical spaces or layers including an application space 210 and a physical space 230. Between the application space 210 and the physical space 230 is a mapping layer 220. As mentioned above, application programs (e.g., word processing applications, desktop publishing applications, etc.) executing on the host computer 110 of the computer system 100 operate on logical objects (e.g., files) in application space 210. The data forming those logical objects is stored on one or more storage devices 241–243 that are included in the storage system 140 and define a physical space 230.

In the illustrative example shown in FIG. 2, storage system 140 is a disk storage system that includes disk drives 241–243. Each disk drive can include one or more disks of a recording medium (e.g., a magnetic or optical recording medium), on which data can be stored, and from which stored data can be read. As discussed above, data stored on each of the disk drives 241–243 is typically organized in units termed "blocks", where each block includes a number of bytes of data (e.g., 512 bytes).

In the illustrative system shown in FIG. 2, the mapping layer 220 is implemented entirely on the host computer 110 of the computer system 100. The mapping layer maps each logical object specified in application space 210 to one or more unique locations (e.g., blocks) in physical space 230 where the data forming the logical object is stored. The mapping layer 220 can include a single layer of mapping, such as a file system 222 or a Logical Volume Manager (LVM) 224, or as shown in FIG. 2, can include multiple mapping layers 222 and 224. When an application program accesses a logical object, such as a file, it identifies the object using a logical object identifier, such as its file name. The mapping layer 220 is typically organized as a data structure that assigns unique locations in physical space 230 to the blocks of data that form each of the logical objects identified in the application space. Thus, when a logical object is written to the storage device 140 by an application program operating in application space 210, the mapping layer defines the physical locations in the storage devices 241–243 that are written by the host computer 110 with the blocks of data that make up the object. Similarly, when a logical object is read by an application program operating in application space 210, the mapping layer 220 uses the logical object identifier to identify the physical locations in the storage devices 241–243 that are read by the host computer 110 to retrieve the blocks of data that make up the object.

For example, a word processing document file 1 to be accessed by a word processing application may be stored on disk 242 at blocks 0–3. The word processing application requests a read of the data forming file 1 by issuing a read command and specifying the logical object identifier of file 1 (e.g., read file 1). Where the computer system 100 includes only a single layer of mapping (e.g., file system 222), the file system 222 maps the logical object identifier file 1 to the physical location where the data is stored (i.e., disk 242, blocks 0–3). The location of the data for the logical object (file 1) that is identified by the file system 222 is used by the host computer to issue the read to the storage system 140. In this manner, the data can be read by the host computer 110 and written into memory 130, where it can be operated upon by the application program. Alternatively, where the word processing application requests a write of the data forming file 1, the word processing application issues a write command specifying the logical object identifier file 1 (e.g., write file 1). The file system 222 maps the logical object identifier file 1 to disk 242, blocks 0–3, whereupon the data in memory 130 corresponding to the identified logical object is written to the appropriate location (i.e.,disk 242, blocks 0–3) by the host computer. The application program has no knowledge about the actual physical location wherein the data forming file 1 is actually located, as the mapping layer 220 handles this mapping task in a manner that is transparent to the application program.

As stated above, the mapping layer 220 may include a number of mapping layers such as file system 222 and LVM 224. The LVM represents an additional layer of mapping that is used in ultimately converting a logical object identifier into the physical blocks that store the data corresponding to the logical object. LVMs are typically used in larger computer systems having a number of storage devices, and enable volumes of storage data to be managed at a logical (rather than physical) level. The presence or absence of the LVM 224 is transparent to the application space. Similarly, the presence or absence of the LVM 224 is also transparent to the file system 222. In this respect, the file system simply maps from the application space to what the file system perceives to be the physical space 230. If another layer of mapping, such as an LVM, is included in the mapping layer 220, it simply means that the result of the mapping done in the file system does not indicate the final mapping to the physical layer.

As in the previous example, when an application accesses the data forming a logical object (e.g., file 1), it specifies the logical object identifier to the file system 222. The file system 222 maps the logical identifier file 1 to a unique location where the file system 222 believes that data for file 1 is stored. However, in contrast to a computer system having only a single layer of mapping, this unique location corresponds to a logical address, rather than an address in physical space 230. The LVM 224, in turn, maps this logical address to physical blocks of data stored in physical space 230 on the disk drives 241–243 of storage device 240.

As should be appreciated from the foregoing, in a typical computer system, a storage system 140 has no understanding of the logical relationship between the blocks of data that it stores in physical space 230. This is true because the logical grouping of data is done in the application space 210, and is not passed to the storage system 140. This can negatively impact the performance of the computer system 100 in two ways.

First, because the storage system 140 has no knowledge of the logical relationship between the blocks of data it stores in physical space, any operation involving the movement of data from one logical object to another can only be controlled by the host computer 110. For example, consider a copy of a first file (file A) to a second (file B). Each block of data in file A is first read by the host computer from the physical location (e.g., a block location on one of disks 241–243) on which the block is stored for file A, and then is written back to the storage system 140 to the physical location wherein the block is stored for file B. As discussed above, each read and write of a block involves the use of the mapping layer 220 to map from the logical object in application space 210 to the location of the data in physical space 230. The reading and writing of data to the storage system 140 is typically performed on a limited number of blocks of data at a time. Thus, depending on how many physical blocks of data are to be copied and how many physically blocks of data are moved at a time, even the simple copying of data from one file to another can consume a significant amount of the host computer's time.

Second, even when a particular logical object is small and can be stored in a small number of blocks, the specific location of those blocks at each layer of mapping can dramatically affect the performance of the host computer, causing even a simple read or write of a logical object to consume significant host computer time. For example, in a typical computer system, the reading and writing of blocks of data is performed only on blocks of data that are logically contiguous in physical space and at each of the mapping layers (e.g., 222, 224). In the previous example of copying one file to another, for any blocks of data of file A or file B that are not logically contiguous at each mapping layer, a typical computer system 100 is required to perform separate input/output (I/O) commands to access (i.e., read or write) the non-contiguous blocks on the storage system 140. For example, on a computer system having only a file system 222 mapping layer that maps file A to blocks 0–1, and 5–6 on the same disk 242, the reading of file A results in two separate read commands to the storage device; one for blocks 0–1, and another for blocks 5–6. If the computer system had a further layer of mapping (e.g., LVM 224) that mapped each of blocks 0–1 and 5–6 to physical blocks that were not contiguous, the simple reading of a four-block file (e.g., file A) would result in four separate read commands being issued to the storage device. Thus, depending on the mapping performed at each layer of mapping, the copying of data from even a small file can result in a large number of individual I/O commands to a storage device and consume significant amounts of the host computer's time.

FIGS. 3 and 4 help to describe in more detail the operations required to copy the contents of file A to file B using a conventional computer system 100 having only a single mapping layer 220, for example, file system 222. As shown in FIG. 3A, a typical file system manages large blocks of data including user data 310, metadata 320, and free space 330. In FIG. 3A, the user data 310 represents that area of memory where user data corresponding to files is stored, and the free space 330 represents blocks of user data that are currently unused. The user data 310 and the free space 330 are shown as a set of contiguous logical blocks of memory 0 to 10,000 that are accessible by the file system. The term "logical block" is used to denote that blocks 0 to 10,000 may map directly or indirectly to blocks in physical space 230, depending on the number of levels of mapping between the file system and physical space. For a computer system having only two disks 241, 242 in the storage system 140, logical blocks 0 to 5,000 may correspond to physical blocks 0 to 5,000 on disk 241, while logical blocks 5,001 to 10,000 may correspond to physical blocks 0 to 5,000 on disk 242, although other mappings are possible. Those logical blocks of memory that are currently unused are circled in free space 330. Typically a table indicating blocks of free space 330 is stored (or cached) in the memory 130 of the host computer 110 (FIG. 1) so that blocks of free space 330 can be allocated quickly by the file system 222 operating on the host computer 110.

The metadata 320 is also typically stored (or cached) in memory 130 of the host computer. The metadata 320 is used by the file system to keep track of the logical assignment of each block of user data 310. Typically, there is a metadata entry for each logical object owned by the file system. As shown in FIG. 3B, each metadata entry includes a number of fields of information, such as the name of the file, the date the file was created, the size of the file (e.g., in bytes), the location of the logical object at the next lowest layer, the level of protection assigned to the file, etc. In a computer system where there is no LVM and the file system 222 maps directly from application space 210 into physical space 230, the metadata entry provides the location and size, in physical space, of the named logical object (e.g., a file). In the example shown in FIG. 3B, the metadata entry tells the file system 222 that file A contains 514 bytes and that the file is stored on disk D1 (i.e., disk 241) at blocks 1 and 3 (where each block equals 512 bytes).

FIG. 4 is a flowchart illustrating steps that are typically performed when the contents of a file A are copied to file B in a conventional computer system that includes a single mapping layer such as file system 222. A copy routine can be called, for example, when an application issues the command to cpoy file A to file B. The copy routine proceeds to step 410 wherein the copy routine issues a file open command using the logical identifier file A. The file system looks to the metadata to determine if file A actually exists.

If a metadata entry for file A does not already exist, the file open may report an error. Alternatively, if an entry for file A exists in the metadata, the file system returns a file handle for file A, i.e., a unique context to identify the routine's session of opening file A. The file handle or context of file A allows the file system to more quickly access the metadata of file A, and is often stored in a cache in the memory 130 of the host computer. Upon the successful return of a file handle for file A, the copy routine proceeds to step 420, where it issues a command to create file B. The file system again looks to the metadata to determine if file B already exists. If a metadata entry for file B does exist such that the writing of the contents of file A to file B would overwrite the data in file B, the routine may return an error or ask the user if the file should be overwritten. If a metadata entry for file B does not exist, the file system creates a metadata entry for file B, along with a file handle or context for the routine's session of opening file B. The metadata entry for file B will contain certain fields of information for file B, such as its name, it creation date, etc. However, other fields of information in the metadata entry for file B will be empty (for example the size of file B, the location of file B, etc.).

After creating a metadata entry and file handle for file B, the copy command proceeds to step 430, where it issues a read of file A. The read command results in the file system determining the location in physical space of the first portion of data in file A, which is determined in this example by accessing the metadata entry for file A. It should be appreciated that if additional mapping layers (e.g., LVM 224) were employed, the actual physical location of the data would be determined by using the information provided by the file system metadata as an index into mapping information (metadata or an equivalent data structure) for the next lowest mapping layer, and that the process would repeat until reaching the lowest mapping layer. In a conventional computer system, the first portion of file A will typically include one or more logically contiguous blocks of data up to some maximum number of contiguous blocks. The maximum number of contiguous blocks and the size of those blocks (e.g., in bytes) may vary based upon a number of factors including the operating system of the host computer, the file system, the storage system, and the interface by which the computer system is connected to the storage system. To simplify the example used herein, only one block is accessed at a time.

After determining the real location of the first portion of data in file A, the first portion of data in file A (located on disk D1, block 1 in the example of FIG. 3B) is read from the appropriate physical device and returned to the copy routine, where it may be temporarily stored in memory 130 of the computer system. Next, the copy routine proceeds to step 440, where it issues a write of the data read in step 430 to file B. To perform the write, the file system accesses the metadata entry of file B via its context. Finding that the size and location fields are empty, the file system will proceed to get one or more blocks from free space 330 (e.g., logical block 0) to store this data. As logical block 0 corresponds to block 0 on disk D1 in the example shown, the data (from file A) is read from the memory 130 in the host computer and written to file B at block 0 of disk D1 in physical space 230. After writing the first portion of file B, the file system updates the metadata fields for file B. For example, the file system will update the size of file B to reflect that it has 512 bytes of data (as only one block was written thus far), and that this first block is located on disk D1, block 0.

The copy routine next proceeds to step 450, where the routine issues a read to get the next portion of user data for file A. As the file system is aware of what has previously been read from file A, the read command results in the file system determining the physical location of the next portion of data in file A by accessing the metadata field for file A in the manner described above. The remaining portion of file A is read and returned to the copy routine, where it may be temporarily written to the memory 130 of the host computer. The routine then proceeds to step 460, wherein the routine issues a write of the returned data to a physical location corresponding to file B. The file system accesses the metadata entry of file B, and proceeds to get another block from free space. In the example shown, the file system allocates the next block of available free space, block 2, for this purpose, although other allocation schemes may be used. After writing the remaining portion of data from the host computer to file B at disk D1, block 2, the file system updates the metadata entry for file B. In this example, the metadata of file B is updated to indicate a size of 514 bytes, and a logical location of disk D1, blocks 0 and 2. After writing the remaining data to file B at step 460, the copy routine issues a file close command, at step 470, to close file A and file B, whereupon the copy routine terminates. When the copy routine closes file B, the updated metadata entry for file B is written back to its appropriate location on disk.

As should be appreciated from the foregoing, in a conventional computer system, a storage device is not aware of the logical relationship amongst the blocks of data stored therein, as only the host computer has this knowledge. As a result, the host computer must be intimately involved in the execution of most operations with the storage device. This is shown by the simple copy example described immediately above, wherein a copy of a two block file requires four I/O operations (two reads and two writes) between the host computer and the storage device. Furthermore, although the host computer utilizes the mapping layers on the computer system to map a logical object to one or more blocks of data perceived to be located in physical space, conventional computer systems are incapable of communicating this mapping information to an application program.

SUMMARY OF THE INVENTION

According to an aspect of the present invention, an Application Programming Interface (API) is provided that allows a relationship between logical objects on a host computer and storage locations on a storage device to be communicated between the host computer and the storage device. By providing the storage device with knowledge of the relationship between a logical object and the storage locations corresponding to that logical object, data corresponding to the logical object can be manipulated directly by the storage device, rather than by the host computer. Manipulations that can be performed by the storage device include moving noncontiguous blocks of data between the host computer and the storage device in a single operation, copying non-contiguous blocks of data from one logical object to another within the storage device and without passing data between the host computer and the storage device, and the initialization, backup, transformation, or secure deletion of a logical object by the storage device, etc. The non-contiguous blocks can include two or more blocks of data that are perceived by the host computer as being located in non-contiguous blocks of a single logical volume, two or more blocks of data that are perceived by the host computer as being located in different logical volumes, or both.

According to one illustrative embodiment, a method of performing an operation is provided for a computer system that includes a host computer and a storage device that includes a plurality of storage locations arranged in a plurality of logical volumes visible to the host computer. The operation involves at least two storage locations in the storage device that the host computer perceives as being located in different logical volumes, and the method includes a step of communicating a single command between the host computer and the storage device instructing the storage device to perform the operation on the at least two storage locations in the storage device.

According to another illustrative embodiment, a host computer for use in a computer system that includes a storage device having a plurality of storage locations arranged in a plurality of logical volumes visible to the host computer is provided. The host computer includes a processor and a controller that controls communications between the processor and the storage device by issuing commands to the storage device. The controller is capable of issuing a single command to the storage device instructing the storage device to perform an operation on at least two storage locations that the host computer perceives to be located in different logical volumes.

According to another illustrative embodiment, a storage system for use in a computer system including a host computer is provided. The storage system includes at least one storage device having a plurality of storage locations arranged in a plurality of logical volumes visible to the host computer, and a controller that controls access to the at least one storage device from the host computer. The controller is capable of responding to a single command from the host computer by performing an operation on at least two storage locations of the plurality of storage locations that the host computer perceives to be located in different logical volumes.

According to a further illustrative embodiment, a method of defining a programming interface for an operation between a host computer and a storage device of a computer system is provided. The operation involves at least two storage locations in the storage device that the host computer perceives to be located in different logical volumes of the storage device, and the method includes a step of defining a single command, for communicating between the host computer and the storage device, to instruct the storage device to perform the operation on the at least two storage locations in the storage device.

According to another illustrative embodiment, a method of performing an operation involving a movement of data from a pair of source storage locations in at least one storage device to a pair of destination storage locations in the at least one storage device is provided for a computer system that includes a host computer and at least one storage device. At least one of the pair of source storage locations and the pair of destination storage locations are perceived by the host computer as being non-contiguous storage locations within the at least one storage device. The method includes a step of communicating at least one command between the host computer and the at least one storage device instructing the at least one storage device to move the data from the pair of source storage locations to the pair of destination storage locations without passing the data to the host computer.

According to another illustrative embodiment, a host computer for use in a computer system including at least one storage device is provided. The host computer includes a processor and a controller that controls communications between the processor and the at least one storage device by issuing commands to the at least one storage device. The controller is capable of issuing at least one command to the at least one storage device instructing the at least storage device to perform an operation involving a movement of data from a pair of source storage locations in the at least one storage device to a pair of destination storage locations in the at least one storage device without passing the data to the host computer, wherein at least one of the pair of source storage locations and the pair of destination storage locations is perceived by the host computer as being non-contiguous storage locations within the at least one storage device.

According to a further illustrative embodiment, a storage system for use in a computer system including a host computer is provided. The storage system includes at least one storage device having a plurality of storage locations. The storage system further includes a controller that is capable of performing an internal move operation wherein data is moved from a pair of source storage locations among the plurality of storage locations to a pair of destination storage locations among the plurality of storage locations without passing the data out of the storage system, wherein at least one of the pair of source storage locations and the pair of destination storage locations are non-contiguous storage locations within the at least one storage device.

According to a still further illustrative embodiment, a method of defining a programming interface for an operation involving a movement of data from a pair of source storage locations in at least one storage device to a pair of destination storage locations in the at least one storage device is provided for a computer system having a host computer and at least one storage device. At least one of the pair of source storage locations and the pair of destination storage locations is perceived by the host computer as being non-contiguous storage locations within the at least one storage device. The method includes a step of defining a data movement command, for communicating between the host computer and the at least one storage device, to instruct the at least one storage device to move the data from the pair of source storage locations to the pair of destination storage locations without passing the data to the host computer.

According to another illustrative embodiment, a method of representing a mapping of a logical object is provided for a computer system having a host computer, a storage device and a plurality of mapping layers that map logical objects on the host computer to storage locations on the storage device. The method includes a step of graphically displaying a single representation of the mapping of the logical object through at least two of the plurality of mapping layers.

According to another illustrative embodiment, a host computer for use in a computer system including a storage device is provided. The host computer includes a plurality of mapping layers that map logical objects on the host computer to storage locations on the storage device, and a graphical user interface to graphically display a single representation of the mapping of a logical object through at least two of the plurality of mapping layers.

According to a further illustrative embodiment, a computer readable medium that is encoded with a program is provided. The computer readable medium, when executed on a host computer that is coupled to a storage device and includes a plurality of mapping layers that map logical objects on the host computer to storage locations on the storage device, performs a method that includes a step of graphically displaying a single representation of the mapping of a logical object through at least two of the plurality of mapping layers.

According to a still further illustrative embodiment, a storage system for use in a computer system including a host computer is provided. The storage system includes at least one storage device having a plurality of storage locations, and a controller that controls access to the at least one storage device from the host computer. The controller is capable of writing data to a first storage location of the plurality of storage locations on the at least one storage device in response to a communication from the host computer that does not include the data to be written to the first storage location.

DETAILED DESCRIPTION OF THE INVENTION

In one embodiment of the invention, an application program interface (API) is provided between a host computer and a storage system to enable the logical relationship amongst blocks of data in physical space to be communicated from the host computer to the storage device. By providing such knowledge to the storage device, a single I/O operation can be performed on logical objects that are mapped to non-contiguous blocks in physical space on the storage device, at any mapping layer in the computer system. For example, a read or write of a logical object including such non-contiguous blocks of data can be performed in a single I/O operation, thereby providing a more efficient and higher performing computer system than has been conventionally provided. Another example of an operation that can be performed on logical objects including non-contiguous blocks in a single operation is prefetching data from a storage system and storing that data in a cache of the storage system for subsequent access by a host computer. Such a prefetch operation is described in related patent application Ser. No. 08/886,605, entitled A METHOD AND APPARATUS FOR PERFORMING A MODIFIED PREFETCH, which is incorporated herein by reference.

In another embodiment of the invention, the passing to the storage device of the logical relationship amongst blocks of data in physical space enables some operations involving the manipulation of logical objects to be done within the storage device, without passing blocks of data between the storage device and the host computer. This also results in improved performance for the computer system.

One exemplary application described below that implements both of the above-described aspects of the present invention is a high speed copy of one logical object to another within a storage device, without passing any of the copied of data between the host computer and the storage device. Although this application is advantageous in that it combines the two above-described aspects of the present invention, it should be appreciated that the present invention is not limited to applications that combine the benefits of both of these aspects of the invention. For example, as discussed above, the aspect of the invention relating to operating upon noncontiguous blocks of data can be used to implement operations that involve the passing of data between the host computer and the storage device (e.g., reads and writes).

Figure 5:
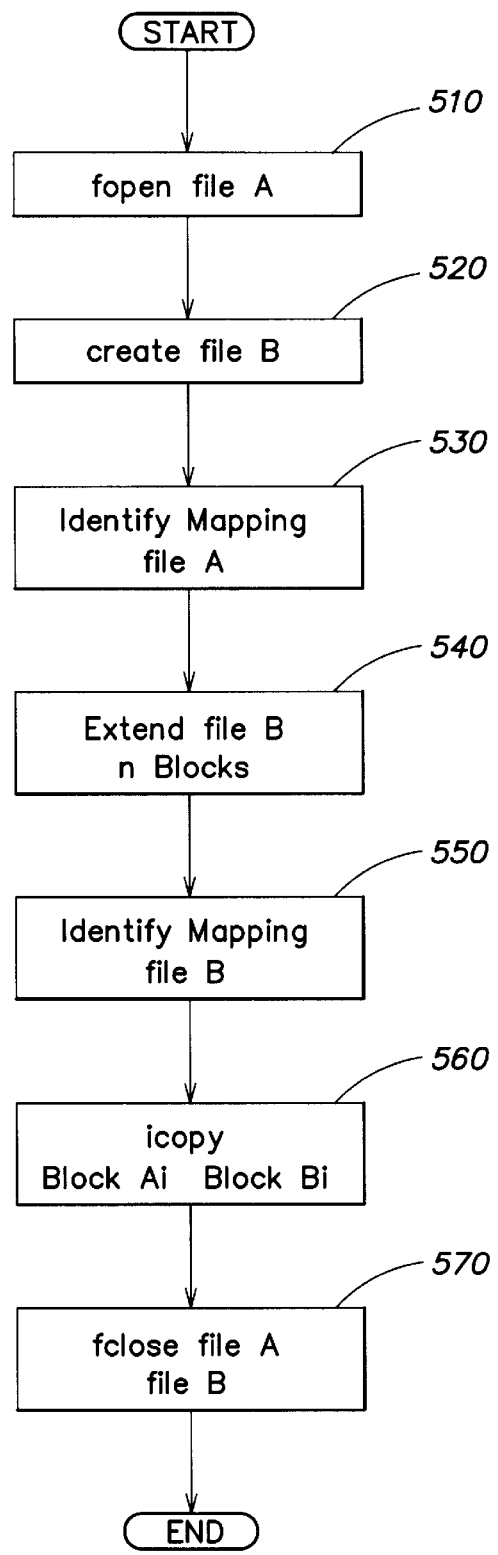
FIG. 5 is a flowchart illustrating a high speed copy routine according to one embodiment of the present invention.

FIG. 5 is a flowchart of one illustrative implementation of a high speed copy routine for copying logical objects in physical space according to one embodiment of the present invention. It should be appreciated that the present invention is not limited to this specific implementation, as numerous variations are possible. To distinguish this high speed copy routine from a conventional copy routine, the term "Hcopy" is used herein. The Hcopy routine described below may be provided a host computer in addition to a conventional copy routine, or may alternatively be used to replace a conventional copy routine. The Hcopy routine can be used to perform a high speed copy of a first logical object (e.g., file A) to a second (e.g., file B) in physical space within a storage device, without the host computer reading the physical data of file A and then writing it back to file B. As described further below, the Hcopy routine can also be used to copy a first logical object stored on a first storage device to a second logical object that is stored on a different storage device, without the host computer reading the physical data of the first logical object and writing it back to the second. In this respect, the storage devices need not be of the same type; e.g., the Hcopy routine can be used to copy a first logical object on a disk drive to a second logical object on a tape drive without the data passing through the host computer.

Figure 2:
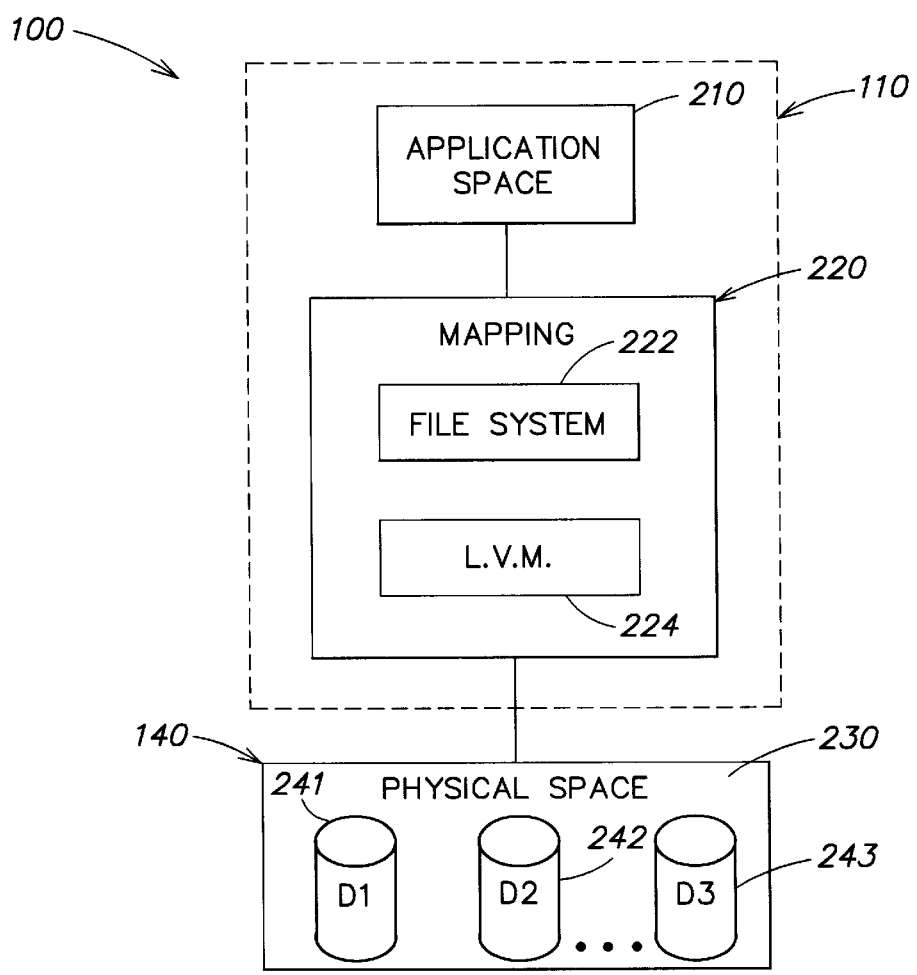
FIG. 2 is a schematic representation of a computer system having a mapping layer that performs a mapping of logical objects to physical space.
Figure 4:
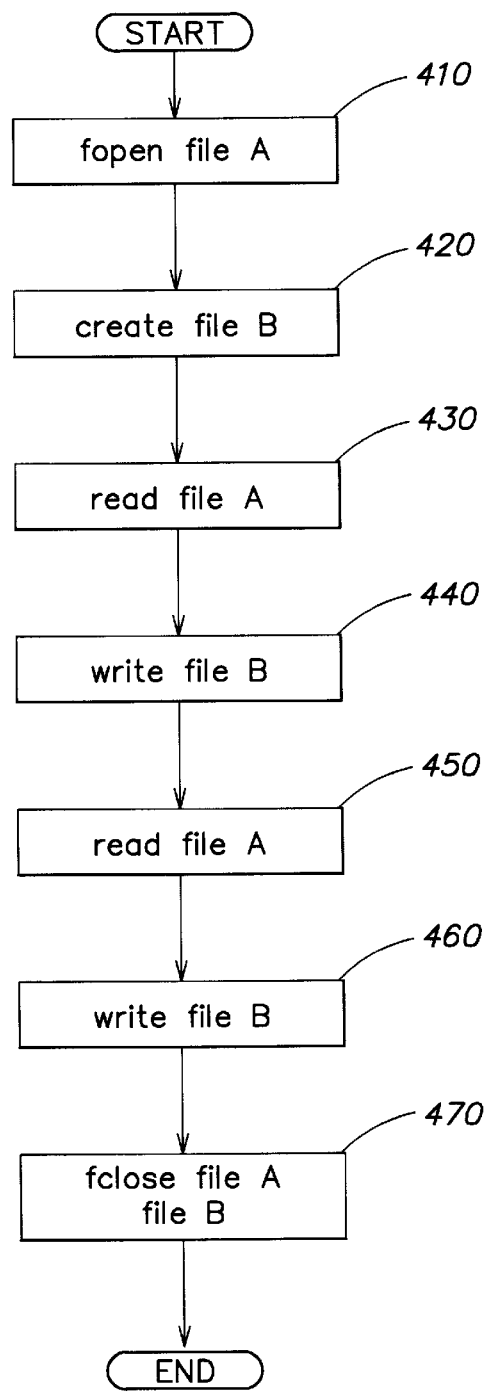
FIG. 4 is a flowchart illustrating a conventional copy command for copying one logical object to another.

An application initiates the high speed copy routine by issuing a command to high speed copy file A to file B (e.g., Hcopy file A file B). At step 510, the Hcopy routine issues a file open command using the logical object identifier file A. As described previously with respect to FIG. 4, the file system may look for a metadata entry for file A to determine if file A actually exists for any of the mapping layers on the system (e.g., file system 222 or LVM 224 of FIG. 2). If a metadata entry for file A does not already exist in the metadata, the routine may report an error. When a metadata entry for file A exists, the file system can return a file handle for file A. However, it should be appreciated that the present invention is not limited in this respect, and can use any technique for accessing the metadata and identifying the logical objects mapped therein.

Upon the successful return of a file handle for file A, the Hcopy routine proceeds to step 520, where it issues a command to create file B. As in a conventional copy routine, the file system may again look to the metadata to determine whether a metadata entry for file B already exists. If a metadata entry for file B exists such that the writing of the contents of file A to file B would overwrite the data in file B, the Hcopy routine may return an error or query the user whether the file should be overwritten. If a metadata entry for file B does not exist, then the file system creates a metadata entry for file B in the appropriate mapping layer (e.g., file system 222 in FIG. 2), and may create a file handle or context for file B. Once again, the metadata entry for file B may contain certain fields of information for file B, such as its name, its creation date, etc., although, other fields of information, such as the size and location of file B will be empty.

Figure 6:
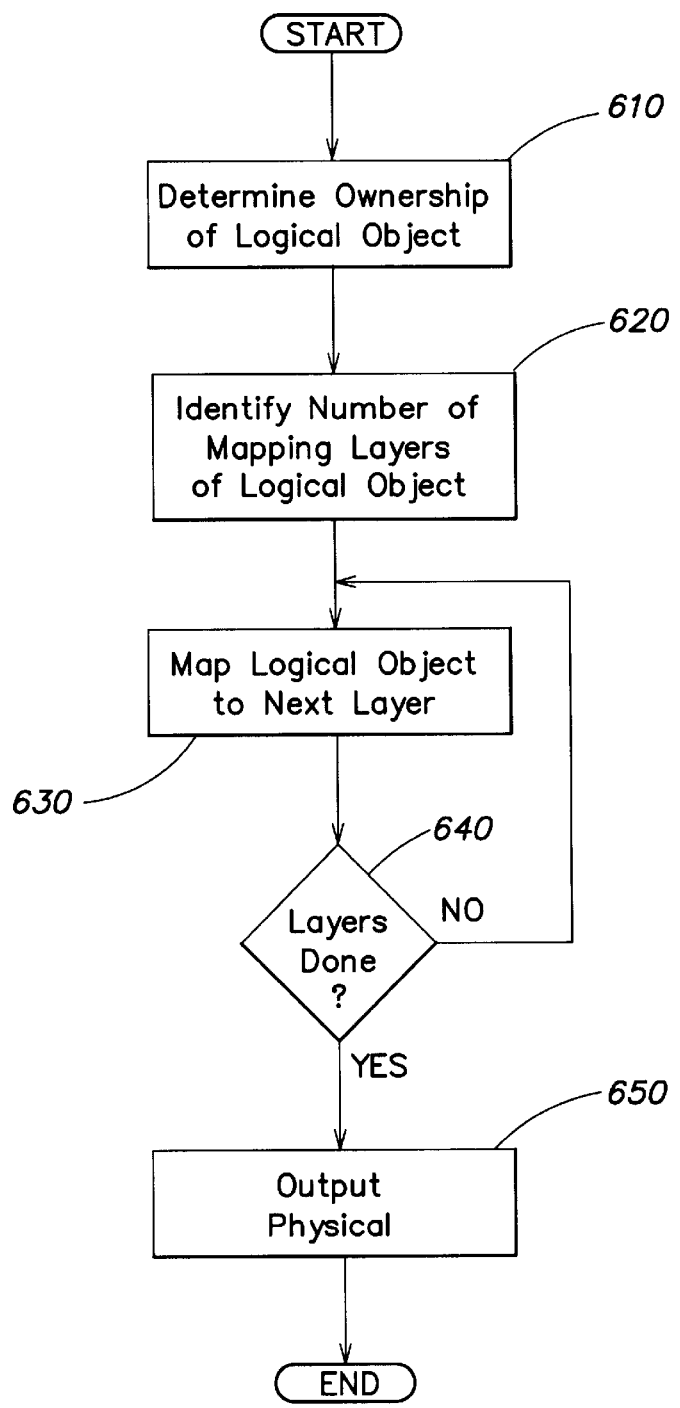
FIG. 6 is a flowchart illustrating a mapping routine according to one embodiment of the present invention.

After creating a metadata entry for file B, the Hcopy routine proceeds to step 530, where the routine requests a mapping for file A by calling a mapping routine such as the one shown in FIG. 6. As described below, the mapping routine of FIG. 6 returns the mapping of the logical object file A in what the host computer 110 perceives to be physical space, along with its size (e.g., in bytes). As discussed below, the storage system may also include one or more layers of mapping, such that the mapping layer 220 in the host computer 110 may not map all the way to the actual physical space. However, in one embodiment of the present invention, this mapping is not taken into account by the mapping routine, so that the location of the block or blocks of a logical object passed to the storage device are provided as outputs of the mapping layer that interfaces with the top mapping layer in the storage device. In the above-discussed example of FIG. 3B, the mapping routine will indicate that file A is physically stored at disk D1, blocks 1 and 3, and has a size of 514 bytes.

Figures 3A, 3B:
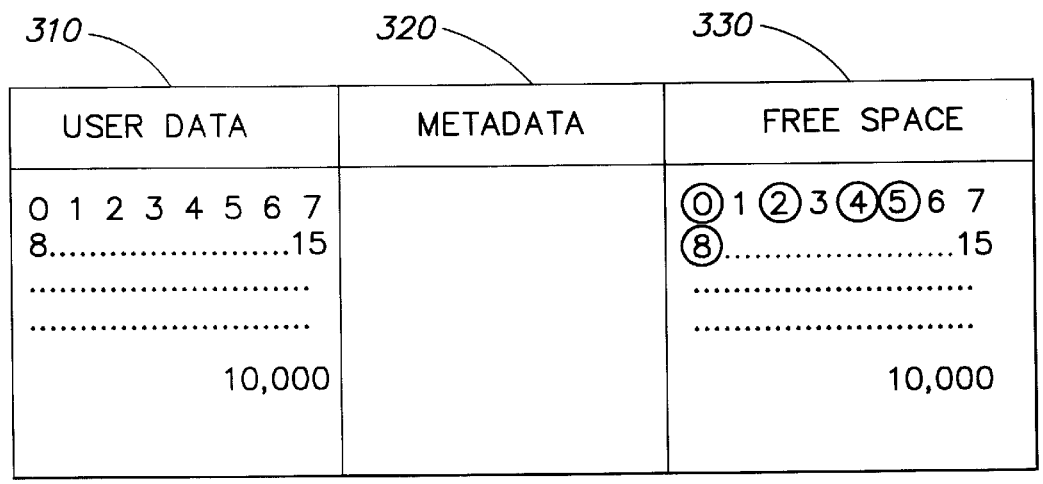
FIGS. 3A and 3B graphically illustrate types of data space in a file system of a computer system.

After receiving the mapping of the logical object file A, the Hcopy routine proceeds to step 540. Assuming that file B did not previously exist (i.e., file B is not being overwritten), at step 540 the routine requests the file system to extend or allocate it a number of blocks for file B sufficient to store the amount of data of file A. Some file systems are already capable of pre-allocating a number of logical blocks to a logical object. Where a file system presently does not support such pre-allocation, the file system can be modified to provide this capability. When pre-allocating blocks to a particular logical object the file system selects the requisite number of blocks from the available blocks in free-space 330 (FIG. 3A). Thereafter, the file system updates the metadata entry of file B. Using the previous example of FIGS. 3B and 4, the metadata entry for file B will indicate that file B is stored at disk D1, blocks 0 and 2, and has a size of 1024 bytes, i.e., the number of bytes in two logical blocks of data.

Next, the routine proceeds to step 550, wherein the Hcopy routine requests the mapping of the logical object file B by calling a mapping routine such as the one shown in FIG. 6. Once again, the mapping routine returns the mapping of the logical object file B in what is perceived by the host computer to be physical space. Although the routine shown in FIG. 6 also returns the size of the logical object, this information is not needed in step 550. Thus, this information can be discarded by the Hcopy routine in step 550, or a dedicated mapping routine can be called that does not return this information. After receiving the mapping of the logical object file B, the Hcopy routine proceeds to step 560, wherein the routine issues a command to the storage device instructing the storage device to do an internal copy of file A to file B. The format of the command, labeled "copy" herein, identifies the location of each physical block of file A and its corresponding destination physical block in file B.

The copy command can be implemented as an API that is issued by the host computer 110 and is supported by the storage system 140 to perform an internal copy within the storage device of one or more source physical blocks of data to one or more destination physical blocks of data. The copy command may have the form: CMD [sequence_of_source_blocks, sequence$_{13}$ of_destination_blocks], where the sequence_of_source_blocks parameter is a list of source addresses uniquely identifying the storage device and location within the storage device where a block of source data is stored, and the sequence_of_destination_blocks parameter is a list of destination addresses uniquely identifying the storage device and location within the storage device where the block of source data is to be written. However, it should be appreciated that the present invention is not limited to this or any other specific command format. In the above example, the host computer issues a command to copy blocks 1 and 3 of disk D1 to blocks 0 and 2 of disk D1. In response to the copy command, the storage system copies the data from disk D1, block 1 to disk D1, block 0, and the data from disk D1, block 3 to disk D1, block 2. After copying the physical blocks of data in step 560, in one embodiment of the invention, the storage device responds with the number of bytes actually written to the specified destination (i.e., 514 bytes). This information can be used (in step 560) to update the metadata entry for file B to indicate that file B has a size of 514 bytes, whereupon the routine proceeds to step 570. At step 570, the Hcopy routine issues a file close command to close file A and file B, whereupon the Hcopy routine terminates. After closing file B, the updated metadata for file B can be written back to its appropriate location, in a manner similar to that discussed previously with respect to FIG. 4.

As noted above, the copy command is a command that is issued by the host computer 110 and supported by a storage system 140 (FIG. 1) to perform a copy within the storage device of one or more source blocks to one or more destination blocks, without passing the data through the host computer. The command can be formatted in any of a number of ways. For example, the command may be implemented by a special write command having a list of source operands and destination operands. The manner in which the special write command can be distinguished from a conventional write command will vary depending upon the nature of the protocol (e.g., SCSI, ESCON) used to communicate between the storage system and the host computer. For example, as will be appreciated by those skilled in the art, such a write command may be distinguished from a conventional write command using vendor specific flags or extensions.

As may be appreciated from the foregoing description, the Hcopy routine permits a storage device to move physical blocks of data corresponding to logical objects directly at the physical level, without having to passing the physical data from the storage system 140 to the host computer 110, and then back from the host computer to the storage device. In this manner, the Hcopy routine increases the efficiency of the host computer system, as CPU cycles that were previously used to move each block of data between the host and the storage system can be used to perform other tasks. This is in contrast to a conventional copy command in the host computer is intimately involved in moving each block of physical data.

In the example above, the data is copied from and written to the same disk D1. However, it should be appreciated that the present invention is not limited in this respect, and that data can be internally copied between different disks. In addition, as described in more detail below, in another embodiment of the invention, a high speed copy can be performed of one logical object to another between different storage systems (e.g., from a disk drive to a tape drive) without passing any blocks of data between the host computer and the storage system.

As discussed above, in one aspect of the invention, the host computer can issue a single I/O command to operate upon (e.g., read or write) non-contiguous blocks. These non-contiguous blocks may be located at storage locations in different logical volumes of the storage system (i.e., at what the host computer perceives to be different physical devices), or at non-contiguous storage locations in the same logical volume. Thus, operations can be performed on any two blocks of data in the storage system in a single command, regardless of whether those blocks of data are located on different physical storage devices, different logical volumes, or at non-contiguous storage locations on the same logical volume. Moreover, by separately identifying each storage location on which the operation is to, be performed, any two non-contiguous blocks of data can be operated upon, regardless of the number of blocks of data separating those two non-contiguous blocks of data.

Although described herein primarily for use with non-contiguous blocks that are logically related, the present invention is not limited in this respect, as applications may make it desirable to operate upon non-contiguous blocks of data in a single I/O, even where those blocks are not part of a single logical object. It should be appreciated that this aspect of the present invention can be used with any type of operation between the host computer and the storage system, including operations that involve the movement of data between the host and the storage system, as well as internal operations such as the internal copy described above wherein no data is moved between the host and the storage system.

It should be appreciated from the foregoing that the aspects of the present invention relating to the passing of information to the storage system of the logical relationship amongst a plurality of blocks involves determining the mapping for the logical objects to the physical locations that the storage system operates upon. Thus, in one aspect of the present invention, the mapping layer 220 is employed to determine the mapping for logical objects. It should be appreciated that the techniques employed in conventional computer systems for determining the mapping of a logical object can be employed for this purpose. Thus, although an example of a mapping routine for determining the mapping of a logical object is described below in connection with FIG. 6, it should be appreciated, that this routine is provided merely for illustrative purposes, and that the present invention is not limited to any particular implementation.

As discussed above, the illustrative mapping routine of FIG. 6 can be executed on the host computer to determine the mapping of a logical object (in application space 210) to a set of blocks that the host considers to be in physical space. The mapping routine can, for example, be implemented in software that is stored in memory 130 (FIG. 1) and executed on the processor 120 of the host.

The mapping routine of FIG. 6 may be viewed as having two parts; a first part that determines how many mapping layers are present on the host computer, and a second part that determines the global mapping of a specified logical object from the application space 210 (FIG. 2) to what the host computer perceives to be physical space. Each of these pieces of information can be determined dynamically each time the mapping routine is called. However, as the number of mapping layers present on the host computer changes only infrequently, in one embodiment of the invention, this information is determined once, and then updated only as needed when changes are made to the mapping layer 220 on the host computer. Thus, the determination of how many mapping layers are present on the host computer need not be performed each time the mapping routine is called. Once this information is obtained, it may be saved on the host computer 110 or on the storage system 140. In one embodiment of the invention, this information is stored in memory 130 on the host computer to minimize delays inherent in accessing this information.

The number of mapping layers present on the host computer may, for example, be initially determined during the Initial Program Load (IPL) of the host computer system. A command utility can be executed on the host computer that keeps a record of each file system and/or LVM that is loaded at system startup. Such a command utility can also be executed periodically, as a background task, to update the record of the mapping layer 220 in the event that another file system or LVM is subsequently mounted. Alternatively, a command utility can be executed that prompts a computer user (e.g., a system manager) to specify which layers of mapping are present when the mapping routine is loaded on the host computer, and each time a file system, LVM or other component of the mapping layer 220 is added or removed from the host computer.

The second part of the mapping routine may be performed each time the mapping routine is called. In summary, the determination of the global mapping of a specified logical object includes determining which layer of mapping owns the specified logical object in application space 210 (FIG. 2), identifying the number of mapping layers present on the host computer that are associated with the specified logical object, and then iteratively mapping the specified logical object, through each layer of mapping, to a set of blocks in what the host computer 110 perceives to be physical space. Where the mapping layer 220 includes only a single layer of mapping, such as a file system 222 or an LVM 224, the specified logical object in application space is mapped directly to a set of physical blocks in physical space. However, where the mapping layer includes multiple layers of mapping, the output of each layer of mapping is iteratively used as an input identifier to the next layer of mapping. When it is determined that no further layers of mapping are involved, the mapping routine returns the set of physical blocks identified at the lowest mapping layer to the application that called the mapping routine.

The mapping routine can be called by the host computer by issuing a call such as "mapping file A", where the identifier file A uniquely identifies the logical object file A in application space 210. At step 610, the mapping routine determines the ownership of the logical object in application space. It should be appreciated some computer systems may have multiple file systems mounted on the host computer 110. For example, on a computer system operating under the UNIX operating system, it is not uncommon to encounter a UNIX File System (IFS), a DOS file system, and perhaps another file system. However, each logical object, such as a file on the computer system, will be owned by no more than one of these file systems. The ownership of a logical object can be determined in any of a number of ways, depending on the type of logical object. For example, where the logical object is a file in a file system 222 resident on the host computer, the mapping routine can request the operating system of the host computer to identify where the file is located. For example, where the logical object is a file on a computer system with the UNIX operating system, the mapping routine can issue the command df file A to request the operating system to tell the mapping routine which file system owns the logical object file A. Other operating systems typically have a similar type of command.

After determining the ownership of the logical object at step 610, the mapping routine proceeds to step 620, wherein the routine identifies the number of layers of mapping that are associated with the specified logical object. In the previous example where the logical object is a file in a file system resident on a host computer with the UNIX operating system, the df command not only identifies which file system owns the specified logical object, but further identifies on which logical device the file system is mounted. Depending on what layers of mapping exist below the file system, the logical device identified for the file system may correspond directly to a location in physical space 230, or may alternatively be mapped by a further layer of mapping such as a LVM 224. However, once the logical device on which the file system is mounted is identified, the mapping routine can then query any LVM that is known to be present on the host computer system to determine whether the LVM maps the identified logical device to a lower layer. Most LVMs allow a user to query the LVM and identify whether a specified logical device is known to the LVM. Where the device is known to the LVM, the LVM will respond with a logical volume address to which the logical device is mapped by the LVM. Where there are no further layers of mapping below the LVM, this logical volume address will correspond to a location in physical space. Alternatively, where the device is not known to the LVM, the LVM will typically respond indicating as much, indicating that the LVM provides no further level of mapping for the file system.

After identifying the number of mapping layers that are associated with the logical object at step 620, the mapping routine proceeds to step 630, wherein the mapping routine determines, for the first mapping layer associated with the specified logical object, the mapping of the object to the next lowest layer in the mapping layer 220. For each mapping layer, this can be done, for example, by accessing the portion of the data structure for the mapping layer (e.g., file system 222 or LVM 224) that stores the metadata for the logical object (e.g., a file) passed to the mapping layer. There are a number of ways of determining where the metadata for a particular file is stored in the data structure of a file system or LVM. For example, the structure and location of the metadata can be obtained directly from the vendor of the mapping layer (e.g., file system 222 or LVM 224). Once the structure and location of the metadata for a mapping layer (e.g., a file system or an LVM) is known, the mapping routine can directly access the structure to access the information that provides it with a window into the next layer of mapping.

After determining the mapping of the specified logical object in the first mapping layer, the routine proceeds to step 640, wherein a determination is made as to whether the location provided by the previous mapping layer is subject, to a further layer of mapping. When it is, the mapping routine returns to step 630, wherein the mapping routine determines, for the mapping layer being processed, the mapping of the object to the next lowest layer in the mapping layer 220 in the manner described above. In this manner, the routine proceeds through each of the mapping layers until it is determined in step 640 that the lowest mapping layer for the specified logical object has been processed, wherein the routine proceeds to step 650. At step 650, the routine returns the location, in what the host computer perceives to be physical space 230, of the blocks of data that make up the logical object for which the mapping was requested when the mapping routine was called. As mentioned above, the routine may also return the size (e.g., in bytes) of the logical object. After returning this information in step 650, the routine terminates.

Although the operation of the mapping routine has been discussed above as operating upon files, it should be appreciated that the host computer may include other types of logical objects on which the mapping routine can operate in the same manner. For example, in addition to one or more file systems and/or LVMs, the computer system may also have a database mounted thereon. The database may be structured'so that each of the objects of the database is a file that is owned by a particular file system, or each object may be a logical device. For example, on a computer system operating under the UNIX operating system, the database may have three objects such as /dev/dev1, /dev/dev2, and /dev/dev3 that each is a logical device. These logical devices may be mapped to a unique location in physical space by the database, or may be mapped by another layer of mapping such as an LVM. Alternatively, the database may have three objects such as /usr/users/dbase/dbfile1, /usr/users/dbase/dbfile2, and /usr/users/dbase/dbfile3, in which dbfile1, dbfile2, and dbfile3 are ordinary files owned by a file system. In this latter case, in addition to the mapping performed by the database and the file system, these files may also be mapped by a further layer of mapping, such as an LVM.

It should be appreciated that the structure for most databases can be identified when the database is mounted on the computer system. Furthermore, the more widely-used databases generally have a structure that can be accessed dynamically to provide a mapping of any object owned thereby to the next layer of mapping. Thus, once it is determined how many different mapping layers are present on the computer system and which mapping layers are involved in the mapping of a particular logical object, determining the mapping of the logical object to a location that the host computer perceives to be in physical space 230 may be readily determined whether that logical object is owned by a database, a file system, or some other object management hierarchy.

It should be appreciated that although the mapping of each logical object is preferably determined dynamically by the mapping routine when the mapping routine is called, the mapping for one or more logical objects can also be determined in advance and kept in a quick lookup table. The lookup table can be created and maintained as a background task, thereby further increasing the efficiency of the host. Such a lookup table may be advantageous where the logical object is frequently accessed and is relatively stable over time.

As discussed above, some storage systems 140 are more than collection of storage devices, and have some intelligence. Such storage systems may be capable of performing one or more additional layers of mapping from that provided by the host computer's mapping layer 220 to physical space 230. This mapping is performed independently of the host computer system, and is therefore transparent to the host. Thus, although the host perceives that the location of the blocks for a given logical object provided by its mapping layer 220 correspond to the location of the data in physical space, this may not be the case. Thus, an intelligent storage system that employs additional mapping may be viewed as receiving a logical address for which it determines a unique physical address, even though the host mapping layer 220 believes it is specifying a physical address in physical space. The mapping done on an intelligent storage system may be optional, so that the system may also be configured so that the addresses it receives define actual physical addresses in physical space 230.

Figure 7:
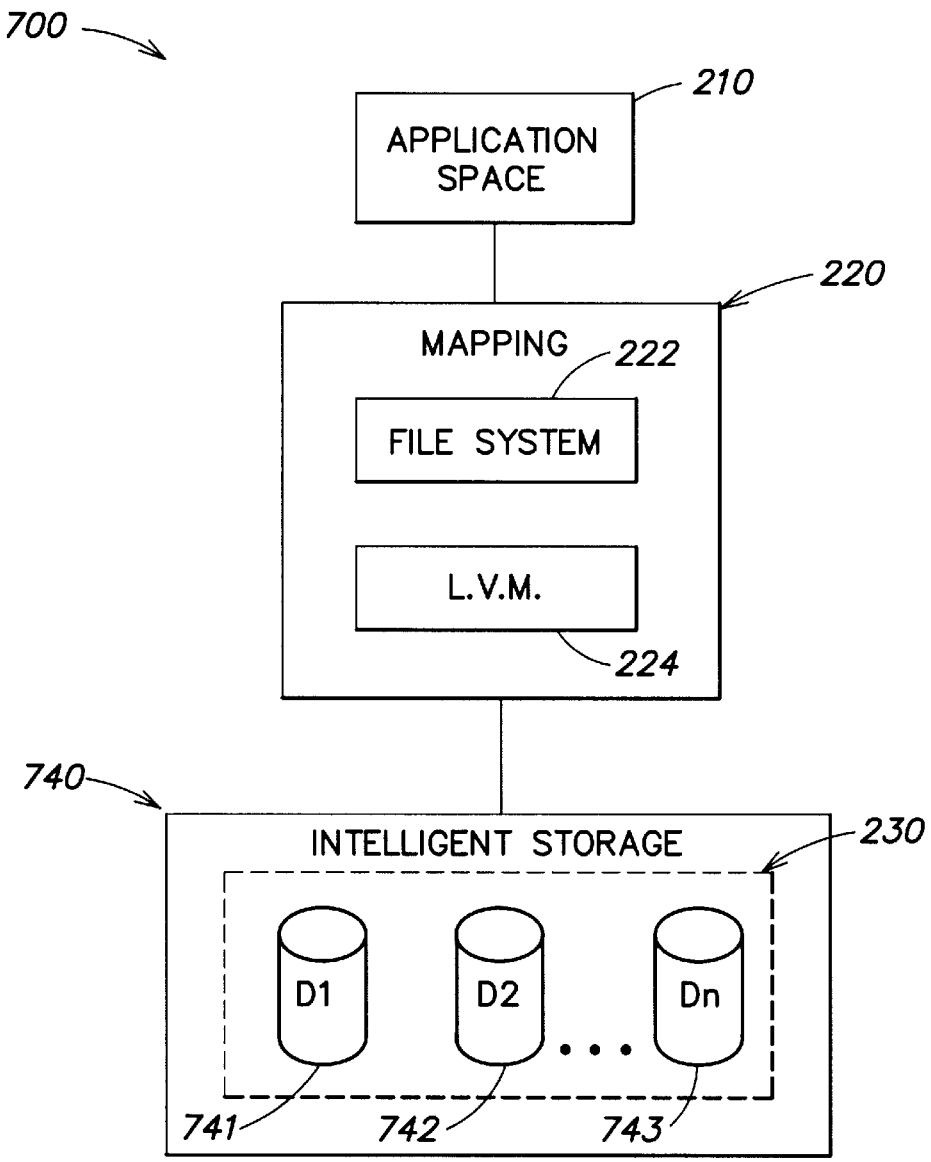
FIG. 7 is a schematic representation of a computer system that includes a mapping layer and an intelligent storage device.

FIG. 7 is a block diagram of a computer system 700 that includes an intelligent storage device 740 capable of performing an additional mapping between the mapping layer 220 on the host computer and physical space 230. The storage device 740 includes a plurality of disk drives 741–743, with each disk drive including several disks. One example of such a mass storage system is the SYMMETRIX line of disk arrays available from EMC Corporation of Hopkinton, Mass. The SYMMETRIX line of disk arrays is described in numerous publications from EMC Corporation, including the SYMMETRIX model 55XX product manual, P-N200-810-550, rev. F, February, 1996.

The intelligent storage system 740 may contain a cache (not shown) to provide improved system performance in a manner that is transparent to the host computer. A read operation typically causes the storage system to determine whether the requested data is in the cache, and when it is, the data is transferred from the cache to the host computer. If the requested data is not in the cache, the storage system 740 determines on which of disks 741–743 the data is stored, and transfers the data from that disk to the cache. The requested data in the cache is then transferred to the host computer. For write operations, data is typically written to the cache, with the host computer system being informed that the write is complete as soon as the data is verified as having been stored in the cache. The device then asynchronously destages the data to the appropriate one of the disk drives 741–743.

It should be appreciated that all of the embodiments of the present invention discussed above can be employed with an intelligent storage system 740 in the same manner as described above. For example, the intelligent storage system 740 can process single I/O operations on non-contiguous blocks specified from the host computer. In this respect, even if the storage system 740 performs an additional layer of mapping, this mapping is transparent to the host computer and would have no impact on the above-described techniques for interfacing between the host and the storage system 740. Similarly, the intelligent storage device 740 can be used to perform internal operations (such as the high speed copy described above) without passing data back to the host computer in the same manner as is described above. Where the storage system 740 includes a cache, such internal operations can be particularly efficient because the reading and writing of data can be performed within the cache, with writes being destaged asynchronously to the appropriate storage device (e.g., one of disk drives 741–743).

Figure 8:
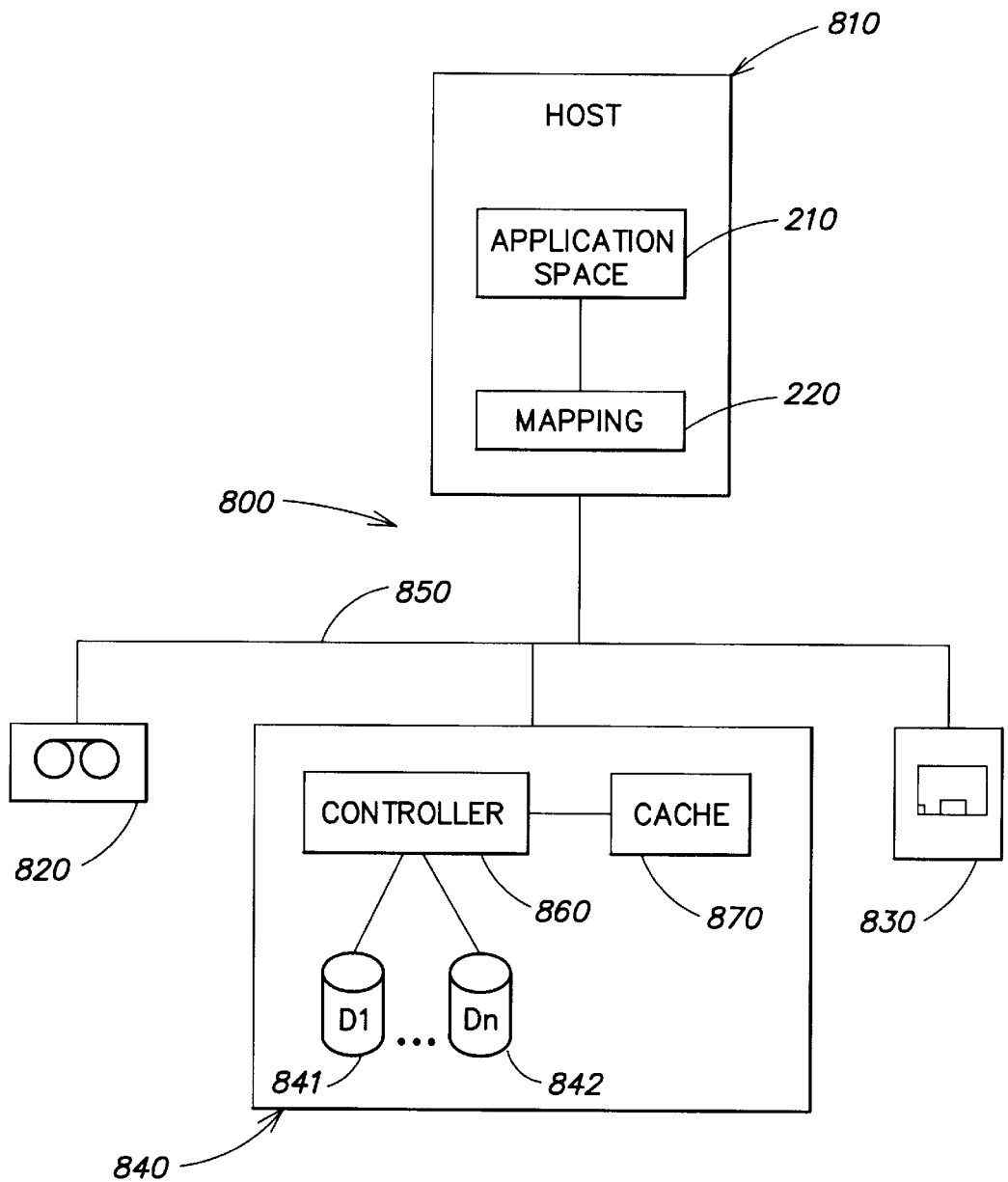
FIG. 8 is a functional block diagram of a computer system that includes a number of different types of storage devices, including a disk array.

In accordance with one embodiment of the present invention, a storage system with some processing power can also be used to perform operations between the storage system and another device, without requiring that the host computer be intimately involved in the operation. For example, FIG. 8 illustrates a computer system 800 having a host computer 810, a tape drive 820, a floppy disk drive 830, and a storage system 840, all interconnected by a bus 850 (e.g., a SCSI bus).

Storage system 840 includes a number storage devices 841, 842 and a cache memory 870 that are coupled to a controller 860. The storage system 840 can be arranged to act as an initiator as well as a target on the bus 850. That is, the storage system may initiate access to any device on the bus 850 as well as be the target of a bus access.

As described previously with respect to FIG. 5, in one embodiment of the present invention, the host computer 810 can execute a special copy command (copy) in which the host computer is not involved in reading and writing the copied data, but merely provides the storage system with the locations of the source and destination blocks for the copy. In one embodiment of the present invention, the source and destination locations may be located on different storage systems. The different storage systems can be of the same type, or can be different types of storage systems. Referring to the illustrative system of FIG. 8, a command can be issued to storage system 840 to copy one or more blocks of data stored thereon to the tape drive 820 or diskette drive 830. Because the device 840 can initiate a read from or a write to any device on bus 850, the device 840 can perform the physical movement of data without passing the data through the host computer 810. Of course, the source and destination can both be within the device 840 as discussed above.

It should be appreciated that the use of the term copy as used herein is intended to encompass all forms of copying data from one location to another, including the "backup" of one or more logical objects. Thus, this embodiment of the present invention can be used to implement any operation involving the movement of data from a source to a destination. For example, in accordance with this embodiment of the present invention, a backup of some portion of the storage system to tape can be performed without requiring that the host computer 810 be involved in reading and writing the backed-up data.

As discussed above, the embodiment of the present invention relating to the passing to the storage device of information defining the logical relationship amongst blocks of data in physical space is not limited to copying data from, one logical object to another. Several additional examples of applications for this aspect of the present invention are provided below. However, it should be appreciated that these examples are not intended to be exhaustive, as numerous other applications for the present invention are possible.

One additional application for the techniques of the present invention is in performing a secure/delete command. On most computer systems, when a particular logical object is deleted from a file system, the file system no longer maintains a mapping of that logical object to the next layer of mapping. However, the physical data corresponding to that logical object is still present on the storage device until overwritten by other data. Thus, as known by one skilled in the art, until the physical data storing the logical object is actually overwritten, the physical storage device can be examined and the contents of the logical object determined. Where the data forming the logical object is considered confidential, a secure/delete command can be used to write meaningless data to the physical location storing the logical object, prior to allowing the file system to abandon its mapping to the next layer.

Figure 9:
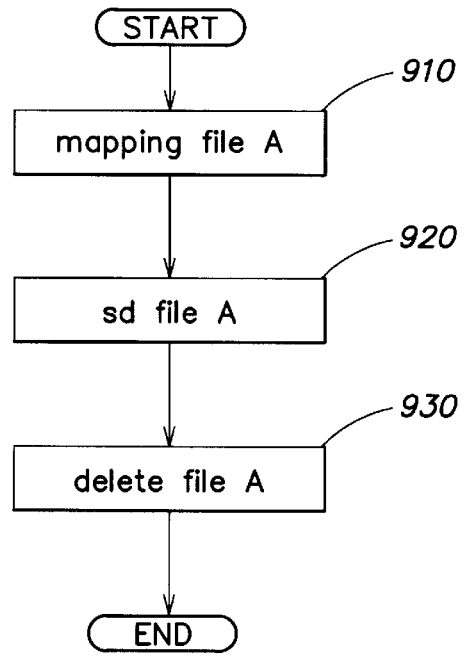
FIG. 9 is a flowchart illustrating a secure/delete routine according to one embodiment of the present invention.

FIG. 9 illustrates an exemplary routine that can be used to implement an efficient "secure delete" routine according to a further aspect of the present invention. Such a secure delete routine can be provided on a computer system that does not have a secure delete capability, or may be loaded to replace or complement an existing secure delete routine. The secure delete routine is preferably used with an intelligent storage system that has the capability of generating its own random or meaningless data when writing to the physical location that stored the deleted logical object. In this manner, the secure deletion of the logical object can involve a single I/O, without the transfer of blocks of data from the host computer to the storage system.

The secure delete routine of FIG. 9 is called by a command (e.g., sd file A) that specifies the logical object to be processed. At step 910 the routine determines the mapping of is file A, by calling a mapping routine such as the one discussed above in connection with FIG. 6. As described previously, the mapping routine returns the mapping of the logical object file A that the host perceives to be in physical space, along with its size (e.g., in bytes). After obtaining the mapping file A, the secure delete routine proceeds to step 920 where it issues a command to securely delete file A. In a manner analogous to the copy command, the sd command (e.g., sd file A) can be supported on both the host computer, and the storage system, and can include a list of arguments indicative of the physical locations to be securely deleted (e.g., by overwriting). The sd command can effectively result in the writing of meaningless data (e.g., nulls) to the physical locations that previously stored the logical object file A. As noted above, where the storage system is an intelligent storage system, the, meaningless data may be generated within the storage system itself, thus avoiding the movement of meaningless blocks of data from the host computer to the storage system. After writing meaningless data to the specified physical locations, the routine proceeds to step 930, where the logical object is deleted from the file system, e.g., using a conventional delete command, whereupon the routine terminates.

As with the illustrative high speed copy command discussed above, the illustrative secure delete command just described is advantageous in that it combines the two above-described aspects of the present invention. However, it should be appreciated that the present invention is not limited to applications that combine the benefits of both of these aspects of the invention. For example, the aspect of the invention relating to operating upon non-contiguous blocks of data can be used to implement an improved secure delete command, even if it involves the passing of data between the host computer and the storage device. Furthermore, the aspect of the invention relating to the manipulation of logical objects within the storage device, without passing blocks of data between the storage device and the host computer, can provide benefits even in a system that executes I/O operations only for contiguous blocks of data.

Where the storage system includes a cache, the sd command may be further optimized. For example, in an intelligent disk array, each cache slot corresponds to a block of physical data. With such a system, the sd command can be effectively performed by writing those cache slots corresponding to the appropriate blocks of physical data with nulls, and then setting a flag that indicates that the data in the cache has been modified. The modified data will then be asynchronously destaged from cache to disk. After performing such a sd command, the secure/delete routine would proceed to step 930, where the logical object is deleted from the file system as described above.

Another application for aspects of the present invention is directed to the manipulation of logical objects is a technique for initializing a logical object to a desired state of all ones or all zeroes. Such a routine would typically be used with large logical objects, e.g., a database object, to initialize the logical object to a known state, typically all zeroes. The initializing of the database object to a known state is advantageous as the end of useful data in the database object can be easily determined. Such a routine can be implemented (like the secure delete command) by passing a single command to the storage system that identifies all of the physical blocks for the logical object, and by generating the initialization data within the storage system. Alternatively, as with the secure delete command, an improved initialization command can be achieved by implementing either of the above-described aspects of the invention separately.

A further application is directed to a routine for transforming a logical object from one type of coding to another. For example, where the storage system is an intelligent storage system that communicates with two or more host computers having a different data formats (e.g., EBCDIC, ASCII, etc.), the storage system can include a routine that transforms the data of a logical object from one format to the other. Thus, the host computer need not read and rewrite the data to reformat it, and/or can operate upon non-contiguous blocks in a single I/O.

Another application for aspects of the present invention relates to a storage system including a cache. In many storage systems with a cache, a command can be sent by the host computer to lock a physical block or a range of physical blocks in the cache. In a conventional storage system, caching is performed on physical blocks of data based on which physical blocks have been most recently accessed by the storage system, but without any understanding that certain physical blocks of data are more frequently accessed than others. By locking a particular logical object in the cache of the storage system, the host computer can guarantee that accesses of the logical object will be performed as quickly as possible, regardless of the caching algorithm used by the storage device.

In accordance with one embodiment of the present invention, a logical object including a plurality of non-contiguous blocks can be locked in a single I/O. This is in contrast to a conventional storage system in which locking non-contiguous blocks in the cache would require either a separate locking command for each non-contiguous block, or would require a single locking command specifying a range of contiguous blocks that include each of the noncontiguous blocks of the logical object. Where the non-contiguous blocks of the logical object are within a narrow range of physical blocks, locking a range of blocks in the cache may be worthwhile. However, where the non-contiguous blocks of the logical object are dispersed over a large range of physical blocks, locking such a large range of blocks may not be possible, and if possible, may compromise the effectiveness of the cache.

According to a further aspect of the present invention, a graphical user interface (GUI) can be provided to display each layer of mapping of a specified logical object. The following example helps to illustrate the usefulness of such a routine. In the example shown in FIG. 10, a logical object file A includes four blocks of data 0-3. The file system has mapped blocks 0–3 of file A to disk D1, blocks 100–103. As further shown in FIG. 10, an LVM has performed a mapping that maps: disk D1, block 100 to a logical volume LV1, block 0; disk D1, block 101 to logical volume LV2, block 0; disk D1, block 102 to logical volume LV3, block 0; and disk D1, block 103 to logical volume LV4, block 0. Such a mapping may have been performed by the LVM to ensure the quick access of file A by striping it across four different logical volumes. However, at the physical level: LV1, block 0 maps to a physical disk D1, block 0; LV2, block 0 maps to the same disk D1, block 100; LV3, block 0 maps to a physical disk D2, block 0; and LV4, block 0 maps to disk D2, block 100. As shown in this example, the intent of the LVM in striping file A across four different physical devices has been at least partially frustrated by the lower level mapping of logical object file A into physical space.

Although a user may be aware that the performance of the system is slower than expected, it is difficult to trace this performance to the mapping of file A without a knowledge of the overall mapping from application space 210 (FIG. 2) to physical space 230. While some applications exist that provide information on the mapping of a specified object, such conventional applications only provide the mapping information of one layer to the next. They are incapable of providing an overall view of the mapping of a logical object through any two or more layers of mapping in the mapping hierarchy. Furthermore, such applications are limited to providing information pertaining to the mapping performed by a LVM on an entire logical volume. These applications are incapable of providing mapping information for any unit of information less than a single logical volume.

Figure 10:
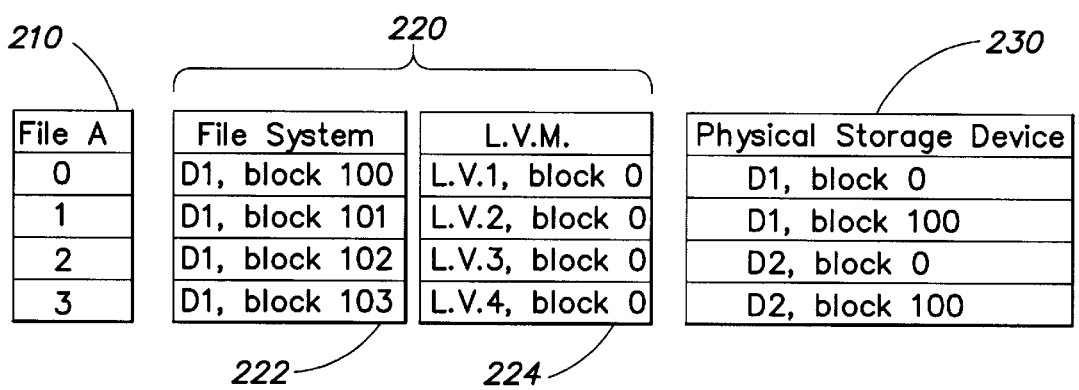
FIG. 10 graphically illustrates the mapping of a logical object in a computer system having a number of layers of mapping.
Figure 11:
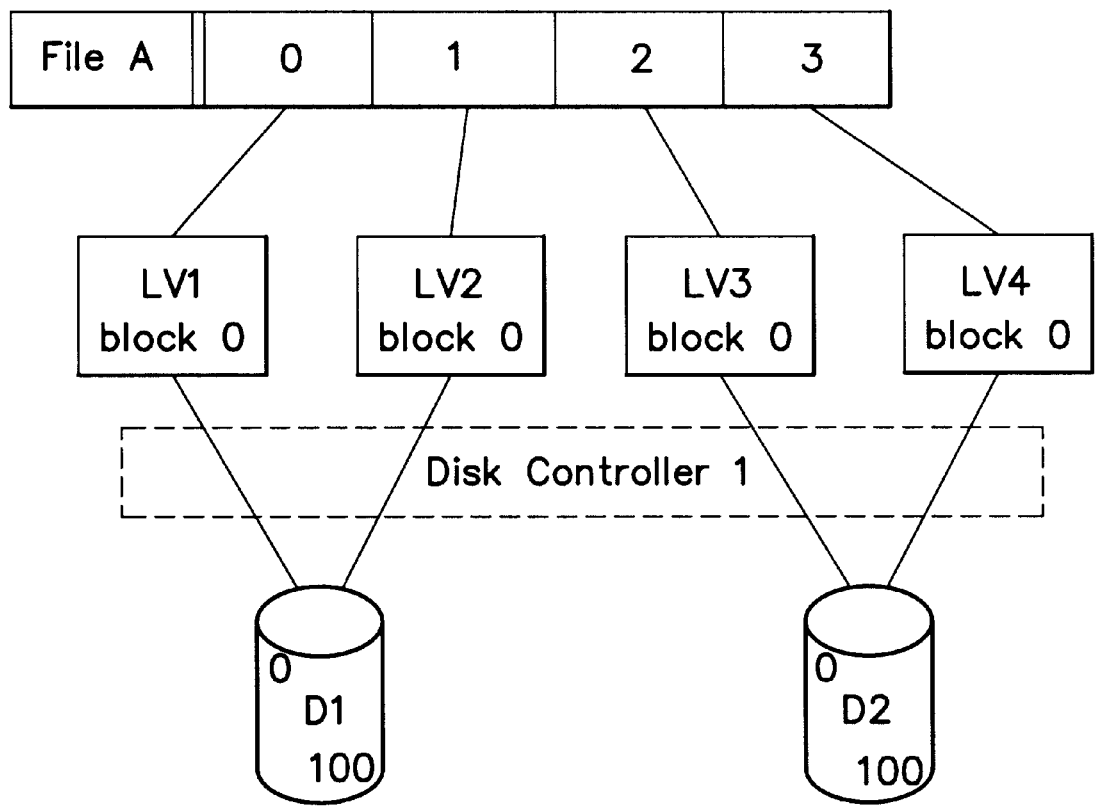
FIG. 11 is an exemplary illustration of a display screen provided by a visualization routine according to one embodiment of the present invention.

FIG. 11 is an exemplary view of a Graphical User Interface (GUI) display screen that can be displayed to a user by a visualization routine according to one embodiment of the present invention. The GUI presents the user with a pictorial and hierarchical view of the mapping of a specified logical object, through each layer of mapping in the hierarchy, to the physical level. Of course, other forms of display may also be provided, for example, a tabular form such as shown in FIG. 10. However, in one embodiment of the invention, the pictorial and hierarchical view depicted in FIG. 11 is provided because it is more readily comprehended by a user. By providing a global view of the mapping for a particular logical object or set of logical objects, a user can quickly determine whether the mapping performed at each layer of the system is optimized for the system's needs. Although it is advantageous to provide a graphical representation through each mapping layer in the system, the present invention is not limited in this respect, and can be employed to graphically represent the mapping through any two or more layers. As shown in FIG. 11, the graphical display presented to the user readily identifies that LV1 and LV2 are on the same physical device D1, and that LV3 and LV4 are on the same physical device D2.

In one embodiment of the invention, the information that is displayed to the user can also include more detailed information of the structure of the storage system itself. For example, where the storage system includes one or more controllers that each controls more than one physical device, the storage device can display this information to the user as discussed further below. As shown in FIG. 11, disks D1 and D2 of the storage device are seen to be controlled by the same disk controller. This may further exacerbate the performance of the system, as the data in each of logical volumes LV1–LV4 is accessed by the same controller. By providing the user with a visual display of the mapping of a specified logical object, such performance issues can be quickly identified.

To implement the above-described GUI, a visualization routine can be executed on the host computer. The visualization routine allows a user to specify one or more logical objects and provides the above-described pictorial and hierarchical view of the mapping of the specified logical object for each layer of mapping in the hierarchy below the specified object. In one exemplary embodiment of the invention, the visualization routine can determine whether an intelligent storage device is present, and when present, query the intelligent storage device to provide information concerning its structure and any mapping performed within the storage device. The information determined by the visualization routine, including structural and mapping information pertaining to the storage device, can be graphically displayed for each layer of mapping in the hierarchy below the specified logical object.

Figure 12:
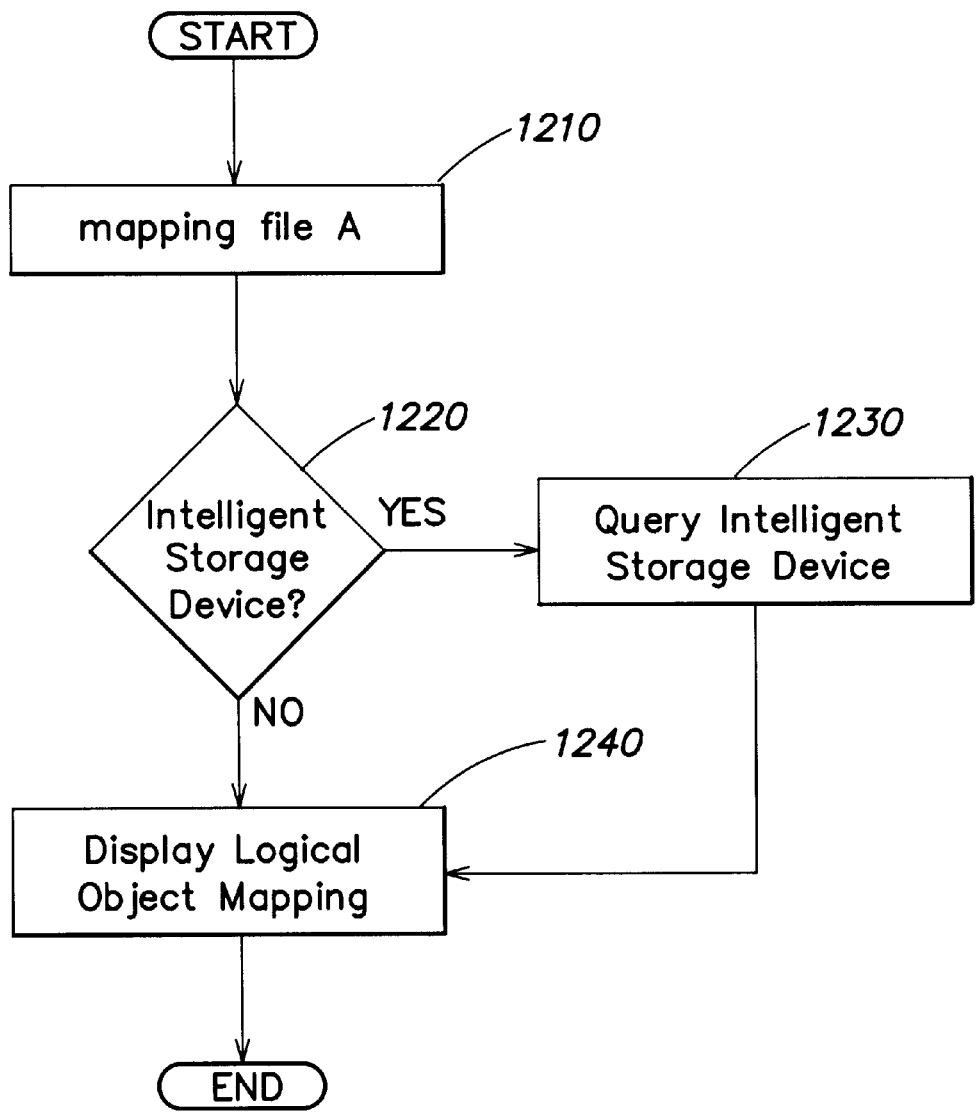
FIG. 12 is a flowchart illustrating a visualization routine according to one embodiment of the present invention for providing a visual display as shown in FIG. 11.

FIG. 12 illustrates one example of a routine for implementing the visualization aspects of the present invention. This routine can be implemented in software that is stored on any form of computer readable medium, such as a diskette, a tape, a CD ROM, etc. Alternatively, the software can be copied from the computer readable: medium to the host computer 110, where it can be loaded into the memory 130 (FIG. 1) and executed on the processor 120 of the host computer 110. The visualization routine is called by issuing a command to visualize the mapping of a specified logical object (e.g., visualize file A). At step 1210, the visualization routine determines the mapping for each layer of mapping on the host computer system for the specified logical object, file A. This can be done using a routine similar to that described above in connection with FIG. 6, although it is not necessary in step 1210 to determine the size of the object in physical space. Furthermore, in contrast to the mapping routine of FIG. 6, the mapping performed at step 1210 retains the mapping information that is determined at each layer of the hierarchy, as this information is to be graphically displayed. Despite these differences, the manner in which the number of mapping layers associated with a particular logical object is determined, and the manner in which the mapping at each layer is determined is similar to that described previously with respect to the FIG. 6.

After determining the mapping of the specified logical object for each layer of mapping on the host computer, the visualization routine proceeds to step 1220, wherein the routine determines whether the storage system storing the physical blocks of file A is an intelligent storage device that has any attributes that would impact the visualization of the mapping for the logical object. Examples of relevant attributes that would impact the visualization are whether the storage system performs any additional mapping, or if it has multiple disk controllers. Typically the host can determine this in advance, for example, when the storage device is added to the computer system. When it is determined at step 1220 that the storage device is not an intelligent storage device, the visualization routine proceeds to step 1240 where the global mapping of the logical object is displayed by a GUI. It should be appreciated that this can be done in any number of ways, and the invention is not limited to any particular implementation.

When it is determined at step 1220 that the storage device is an intelligent storage device with relevant attributes, the routine proceeds to step 1230, wherein the intelligent storage device is queried. As noted previously, some storage devices are capable of performing an additional layer of mapping within the device itself. Furthermore, some storage devices include a number of controllers in addition to a number of physical storage devices (e.g., disk drives, tape drives, etc). The exact structure of the storage device and the mapping that is performed within the storage device can be determined by querying the storage system. For example, for a SYMMETRIX storage device, by sending a status command with a specific extension, the SYMMETRIX storage, device responds with detailed information indicating the mapping (in terms of physical blocks of data on particular disk drives) pi each logical volume address provided to the storage system. The SYMMETRIX storage device further indicates which controllers correspond to each particular logical volume. Thus, when the intelligent storage device is queried at step 1230, it provides detailed information regarding the specific structure of the storage device and the mapping of each logical volume it maintains. After gathering this information, the visualization routine proceeds to step 1240, wherein the visualization routine calls a graphical user interface routine to display the global mapping of the logical object through each layer of mapping in the host computer and the storage device.

The displaying of the global mapping can be presented to the user in any number of ways (two examples of which are shown in FIGS. 10 and 11), and the present invention is not limited to any particular representation format. Moreover, the visualization routine can be modified to show, for a specified object, only those levels of mapping below a specified level in the mapping hierarchy. Furthermore, although including the mapping and structural information within the storage device is advantageous, the present invention is not limited in this respect.

Several of the applications described above (e.g., the "copy" of FIG. 5 and the "secure/delete" of FIG. 9) include steps of determining the mapping of a logical object through one or more layers of mapping that are present on a host computer (e.g., 110 in FIG. 2), an intelligent storage system (e.g., 740 in FIG. 7), or both. Although this mapping of logical objects may be performed by a mapping routine such as that described with respect to FIG. 6, other mapping routines may alternatively be used. One aspect of the present invention is directed to providing information identifying the mapping of an object through a mapping layer to any application program. This aspect of the invention is not limited to use with those applications discussed above, and can be used with any application program.

According to one embodiment of the present invention, a layer-specific mapping routine can be provided for any type of mapping layer (e.g., a file system mapping layer, a database mapping layer, a logical volume mapping layer, or an intelligent storage system mapping layer). The mapping routine can be implemented as an API that can be called by any application program to provide the application program with the mapping of a specific logical object, through the specified mapping layer, to the next layer below. In another embodiment, the mapping routine can provide the application program with detailed information on objects that are known to a mapping layer and the organization of objects within the mapping layer. In a further embodiment, both of these aspects are combined to provide a single API capable of providing an application program with the organizational structure of a mapping layer, as well as the mapping of specific logical objects through that mapping layer to the next layer below.

Figure 13:
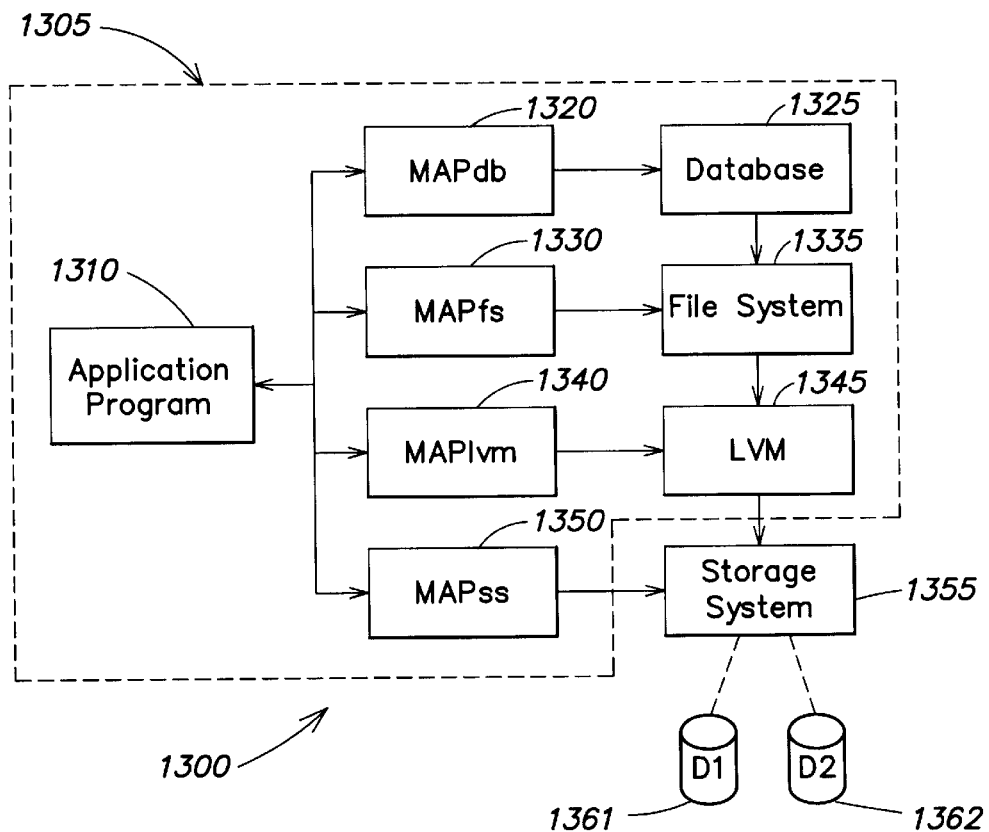
FIG. 13 is a schematic representation of a computer system including several APIs according to one embodiment of the present invention.

FIG. 13 is a schematic representation of a computer system including a number of mapping layers, each with a corresponding layer-specific mapping routine according to one embodiment of the present invention. The computer system 1300 includes a database mapping layer 1325, a file system mapping layer 1335, and a LVM mapping layer 1345 on the host computer 1305. The system also includes an intelligent storage system mapping layer 1355 on the intelligent storage system (not shown), such as that described with respect to FIG. 7. As shown in FIG. 13, an application program 1310 can call one or more of layer-specific mapping routines 1320, 1330, 1340, 1350 on the host computer 1305 to provide the mapping of an object, or information pertaining to a mapping layer. As described further below, each layer-specific mapping routine can determine the organizational structure of a mapping layer and the mapping performed by that mapping layer by querying the operating system of the computer system 1300, by issuing commands to the mapping layer when the mapping layer supports such commands, by accessing data structures of the mapping layer, etc. To illustrate the operation of the layer-specific mapping routines, an exemplary database mapping routine 1320 is described below. The other mapping routines work in a similar way.

The database mapping routine 1320 is called by the application program 1310 by specifying the name of the database mapping routine (e.g., the API), identifying the operation to be performed by the database mapping routine, and providing any arguments that are needed to perform the requested operation. The database mapping routine API provides a number of functions, with certain functions allowing the specification of arguments to return different information. Where the database 1325 includes user accounts that are protected by a password, the application program may need to provide the appropriate connection information to the database (e.g., a system or administrative account, and password) to access all the requested information. Moreover, if the database is mounted on a computer system that is different than the computer system 1300 on which the application program 1310 is executing, the application program may also need to specify connection information identifying the computer system on which the database is mounted, and the communication port on which the database can be accessed.

In one embodiment of the invention, examples of operations that can be performed by the database mapping routine 1320 include providing a listing of all tables that are known to the database, all table spaces (i.e., a grouping of database files) that are known to the database, all database files that are known to the database, and all user accounts that are known the database. When provided with additional information in the form of arguments, the database mapping routine 1320 can also provide the application program 1310 with information detailing all tables that are accessible to a particular user, all table spaces that a particular file spans, all database files that belong to a particular table space, etc. As should be appreciated from the foregoing, through one or more operations, the database mapping routine 1320 permits the application program 1310 to identify the organizational structure of the database mapping layer 1325 in terms of objects known to that mapping layer 1325. This knowledge of the organizational structure of the database mapping layer 1325 allows the application program 1310 to identify the path name, in terms of the database mapping layer 1325, of any database file that is owned by the database. Once the path name of the database file is-identified by the database mapping routine 1320, or alternatively, if the application program already knows the path name, the application program can request the database mapping routine to provide the location of that database file at the next lowest mapping layer (e.g., layer 1335 in FIG. 13).

The operation of each of the other layer-specific mapping routines 1330, 1340, 1350 is similar to that of the database mapping routine 1320 described above. Each layer-specific mapping routine can be called by the application program 1310 by specifying the name of the mapping routine, identifying the operation to be performed by the mapping routine, and providing any arguments that are needed to identify the nature of the requested information. For example, the file system mapping routine 1330 can provide information to the application program 1310 identifying the type of file system 1335 (e.g., a UFS file system; an IBM JFS file system, a Veritas VXFS file system, etc.), whether the file system is mounted or unmounted on the computer system 1300, the structure of the file system (in terms of directories and files), and the location of a particular file at the next lowest mapping layer (e.g., layer 1345 in FIG. 13). Similarly, the LVM mapping routine 1340 can provide information to the application program 1310 identifying any logical volume groups defined for the LVM 1345, the logical volumes defined for a particular logical volume group, the type of a particular logical volume (i.e., whether the logical volume is a simple logical volume, a concatenated logical volume, a striped logical volume, a RAID-5 logical volume, a mirrored logical volume, etc) and how the logical blocks or extents of logical blocks are organized in each logical volume. The LVM mapping routine 1340 can also provide the location, in terms of blocks of data in physical space as perceived by the LVM mapping layer 1345, of each logical block of data at the layer below (e.g., storage system layer 1355 in FIG. 13). As noted previously, these physical locations as perceived by the LVM mapping layer may be actual physical locations on a storage device, or may be subject to a further layer of mapping. The intelligent storage system mapping routine 1350 can provide information to the application program 1310 identifying each storage device on the intelligent storage system, its extent in terms of physical blocks of storage, the organization of the physical devices (e.g., whether they are concatenated, striped, or mirrored, etc.), and the nature and extent of any striping or mirroring.

It should be appreciated that the above-described information that can be provided by each of the layer-specific mapping routines 1320, 1330, 1340, 1350 is exemplary only, and that the present invention is not limited to the extent or type of information provided. Rather, each of the layer-specific mapping routines may be generally viewed as providing any application program with structural information about a mapping layer, and can be customized to provide whatever information is desired by an application program. Each layer-specific mapping routine can be implemented as an API that can be called by a variety of different application programs in the same manner, independently of the type of structural information being sought.

Moreover, any one or more of the layer-specific mapping routines can be called by an application program to provide the mapping of a logical object to the next mapping layer below, without necessarily identifying the organizational structure of the mapping layer. Accordingly, an application program can call each layer-specific mapping routine, in turn, to provide the mapping of a logical object at each mapping layer in the mapping hierarchy. It should be appreciated that although a layer-specific mapping routine can combine both of these aspects, the present invention is not so limited.

As noted above, each of the layer-specific mapping routines can determine the organizational structure of a mapping layer and the mapping of logical objects performed by that mapping layer to the next layer below by querying the operating system of the computer system, by issuing commands to the mapping layer when such commands are supported by the mapping layer, by accessing the structure of the mapping layer, or a combination of one or more of these techniques. The particular steps that are performed by each mapping routine will vary depending upon the type of mapping layer, the particular provider or vendor of the mapping layer, and the nature of the information that is requested by the application program.

Figure 1:
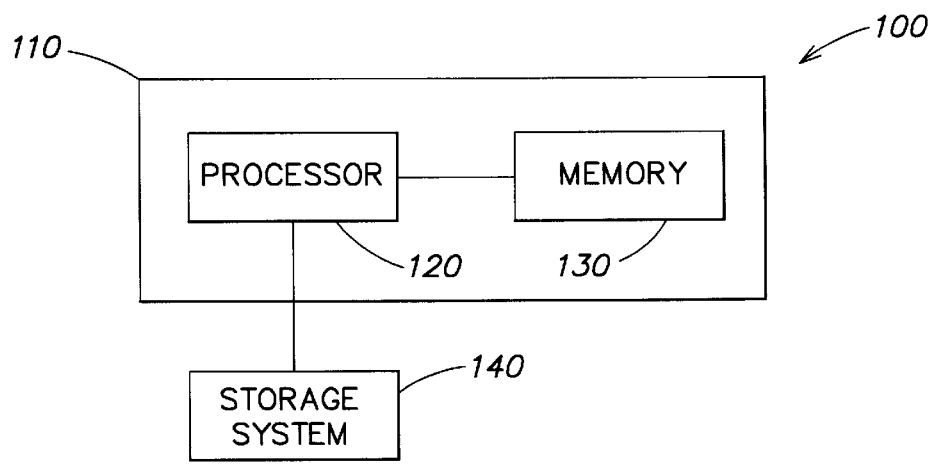
FIG. 1 is a functional block diagram of a computer system.

For example, for the file system mapping layer 1330, the information pertaining to the A organizational structure of files and directories within the file system 1355 can be determined by querying the operating system of the host computer (e.g., 110 of FIG. 1). Information identifying the mapping of logical objects of the file system to the next layer below can be determined by accessing the metadata for the file system as described previously with respect to FIG. 6.

With respect to the database mapping layer 1325 or the LVM mapping layer 1345, some databases and LVMs include a set of commands that permit the structure of the database or LVM and the organization of objects within the database or LVM to be identified. For example, some databases support a command to provide a list of different objects known to that database. Such commands are typically only available to a privileged user, and are not available to an application program. Moreover, although some LVMs are capable of graphically showing the organization of logical volumes defined for that LVM, they are incapable of providing mapping information for any unit of information that is less than a logical volume. However, when such commands are supported, these commands can be executed by a layer-specific mapping routine (e.g., 1320, 1330, 1340, 1350) to access mapping information and provide it to the application program 1310. When such commands are not supported, or when information is requested by certain types of application programs that is not available through the use of such commands, the layer-specific mapping routine can examine data structures that are associated with the mapping layer to provide the requested information.

The process of determining where and how mapping information is stored in such data structures can readily be determined by one skilled in the art. For example, for any type of mapping layer, a simplified computer system can be constructed by installing only a single mapping layer that maps logical objects into physical locations on a storage system. The location of each logical object in application space (e.g., 210 in FIG. 2) is known, and the location of each logical object in physical space (230, in FIG. 2) can be readily determined on such a simplified system. Thus, the only unknown in the simplified system is the mapping that is performed by the single mapping layer to map each logical object in application space to one or more physical locations in physical space. By making changes to logical objects in application space and observing the effect of those changes in physical space, one skilled in the art can determine the mapping algorithm that is used by the single mapping layer. That is, a unique function expressing the mapping performed by the single mapping layer can be identified. This mapping function can be used to determine how logical objects are mapped by this same layer of mapping to a next lower layer when other mapping layers are mounted on the computer system. Once the mapping algorithm has been determined, the mapping routine can use this algorithm to respond to queries regarding the mapping of a specified logical object. In this way, such queries can be processed without accessing the actual mapping data for the particular mapping layer.

Alternatively, by analyzing data structures that are associated with a mapping layer, one skilled in the art can also determine the location and the meaning of mapping information that is stored in its associated data structures. This knowledge of the data structures associated with the mapping layer can then be used to construct a mapping routine capable of accessing mapping information in the data structures associated with the mapping layer. Thus, when an application program asks for the mapping of a specified logical object, the mapping routine can read the proper information from the data structure to provide this information to the application program. For example, information pertaining to the structure of the mapping layer and the organization of objects within the mapping layer can be determined by querying the operating system or the mapping layer itself. The information pertaining to the mapping of a particular logical object at the next layer below is generally determined by understanding the location and meaning of mapping information stored in data structures associated with a particular mapping layer, and then accessing the appropriate information within that data structure to provide this information to the application program.

As should be appreciated by one skilled in the art, both of the above methods for determining how a particular mapping layer is organized and how the mapping layer maps logical objects to the next layer below can be used together or independently by a mapping routine. For example, when an application program requests the location of a logical object at the next layer of mapping, the mapping algorithm can be used to generate the requested information. When information is requested regarding the structure of the mapping layer, examination of the data structures associated with the mapping layer can be performed. Moreover, the present invention is not limited to providing both types of information in a single mapping routine, or providing this information for each mapping layer on the computer system.

Figure 14:
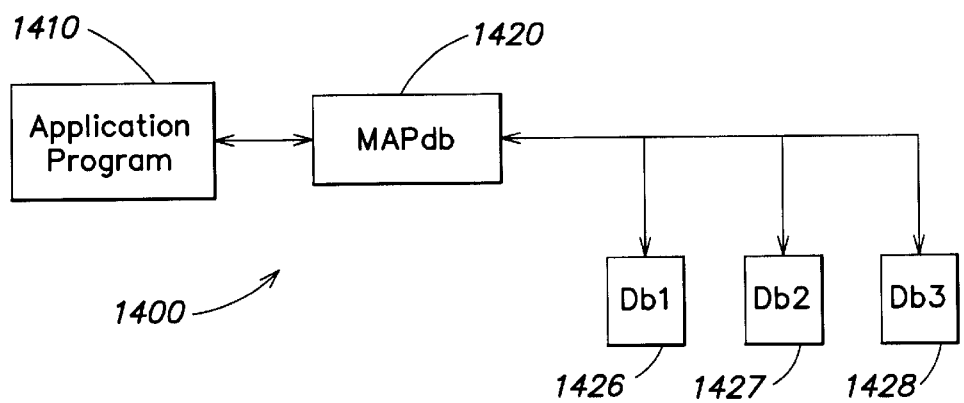
FIG. 14 is a schematic representation of a computer system that includes a number of different mapping layers of the same type.

According to a further embodiment of the present invention, a layer-specific mapping routine can provide a single API that interfaces an application program with multiple mapping layers of the same type (e.g., for an ORACLE database mapping layer, a SYBASE database mapping layer, or an INFORMIX database mapping layer). A schematic representation of such a computer system having a number of different database mapping layers is depicted in FIG. 14. As shown in FIG. 14, the computer system 1400 includes three different databases mounted thereon (i.e., 1426, 1427, 1428). A single API 1420 can provide detailed information to an application program 1410 relating to the structure of the mapping layers, the organization of objects within the mapping layers, and the mapping of logical objects to the next layer below for each mapping layer. Such an API is particularly useful on large and complex computer systems having one or more different mapping layers (e.g., 1426, 1427, 1428) because the API provides a common interface to the application program for thee different mapping layers of the same type. An application program can therefore call the API in the same manner, perform the same type of operations, and receive the same type of information for different mapping layers of the same type, without having to learn multiple interfaces for different vendors.

As different mapping layers of the same type will generally have different data structures, the manner in which a mapping routine determines the structure and organization of the mapping layer and the mapping of logical objects to the next layer below will generally vary among different mapping layers of the same type. To provide a consistent interface to the application program, each mapping routine may perform some processing of the information that is collected prior to providing it to the application program. Although described in terms of databases, this aspect of the present invention is useful for any other type of mapping layer. Moreover, this aspect of the present invention can be used for each layer of mapping to provide a single API that is common to different mapping layers of the same type.

According to one embodiment of the present invention, each mapping routine that interfaces to two or more different mapping layers of the same type supports an argument that can be specified by the application program 1310, 1410 to identify the particular type of mapping layer for which information is requested. Alternatively, when multiple mapping layers of the same type are present on the computer system and the particular type of mapping layer is not identified to the mapping routine, the mapping routine can query the operating system, or each of the different types of mapping layers known to exist on the computer system, to identify the particular type of mapping layer for which information is requested. The mapping routine can then provide the information requested to the application program in the manner described above.

According to a further embodiment of the present invention, a top-level mapping routine can also be provided that can be called by an application program to provide the application program with the mapping of a specified logical object through any two layers of mapping on the computer system. For example, the top-level mapping routine can provide the mapping of a specified logical object for all mapping layers on the host computer as well as any layers of mapping on an intelligent storage device that is connected thereto. The top-level mapping routine can call one or more of the afore-mentioned layer-specific mapping routines (e.g., 1320, 1330, 1340, 1350 in FIG. 13) to provide the application program with the mapping of a specified logical object through each layer of mapping in the mapping hierarchy.

In one embodiment, the top-level mapping routine is implemented as an API that provides a common interface for any application program to determine the mapping of a logical object through each mapping layer on the computer system, without requiring the application program to be aware of the number and arrangement of mapping layers in the hierarchy. The top-level mapping routine can receive an identifier of a specified logical object from the application program and provide the mapping of that logical object to one or more physical blocks of data in physical space (e.g., 230 in FIG. 2). In another embodiment, the top-level mapping routine provides the application program with the location, in terms of blocks of data forming that object, at both the physical level as perceived by the lowest layer of mapping on the host computer (e.g., the LVM mapping layer 1345 in FIG. 13), as well as the actual physical location of each block of data in physical space. This can be particularly useful where the computer system includes an intelligent storage device (e.g., 740 in FIG. 7) that also performs a layer of mapping. Providing the mapping to the lowest level on the host, or all the way to physical space may be preferred by the application program, depending on the task being performed by the application program. Any mapping information that is not needed by the application program calling the top-level mapping routine can simply be discarded. Of course, other embodiments could provide the mapping in one form or the other.

Figure 15:
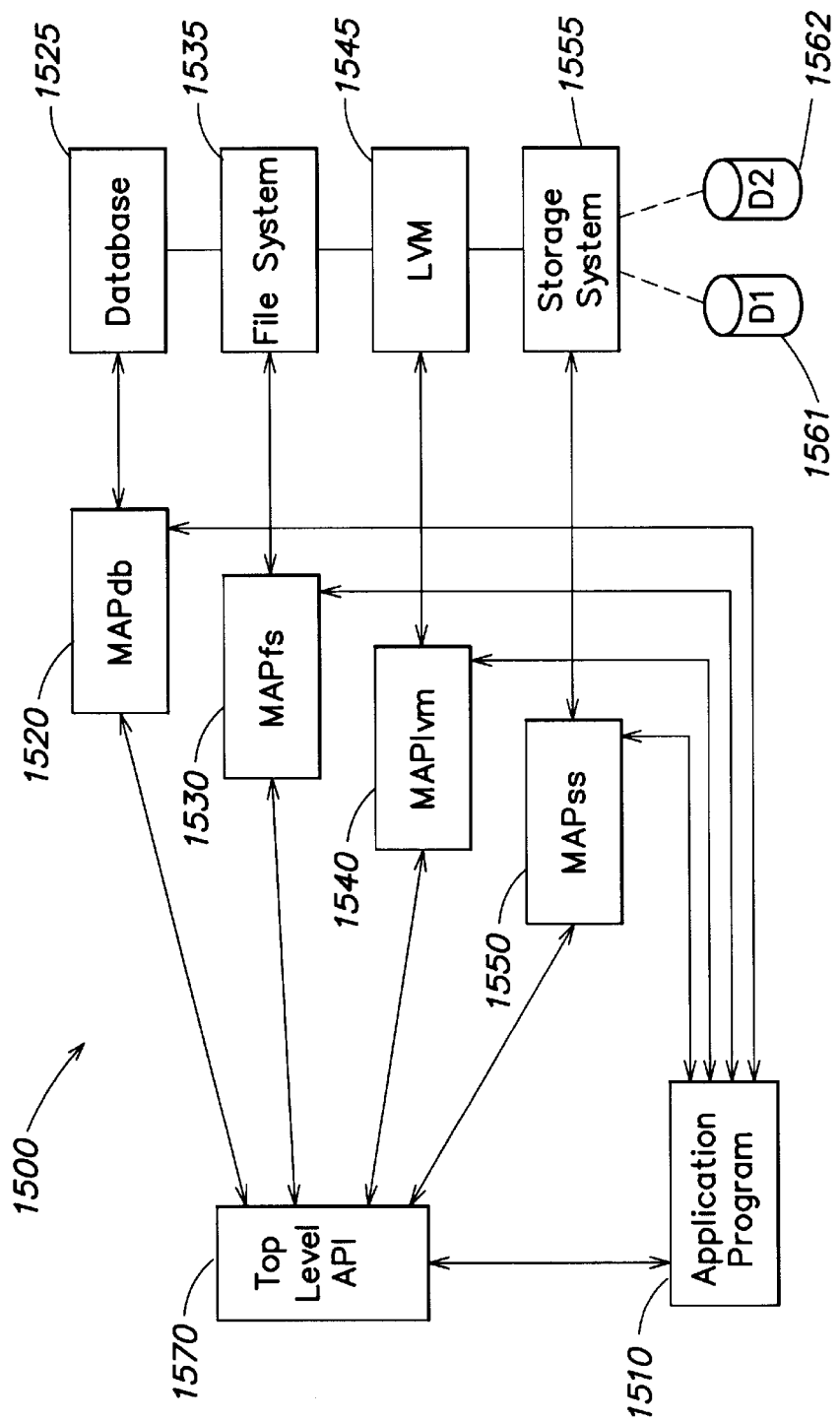
FIG. 15 is a schematic representation of a computer system that includes several APIs according to another embodiment of the present invention.

FIG. 15 is a schematic representation of a computer system 1500 including a top-level mapping routine 1570 according to one embodiment of the present invention. As shown in FIG. 15, the top-level mapping routine 1570 can be implemented as an API that interfaces an application program 1510 to one or more layer-specific mapping routines 1520, 1530, 1540, and 1550. According to one embodiment (not shown), the application program 1510 communicates with one or more of the layer-specific mapping routines

1520, 1530, 1540, 1550 only through the top-level mapping routine API 1570. Alternatively, in the embodiment shown in FIG. 15, the application program 1510 communicates not only with the top-level mapping routine API 1570, but also directly with at least one of the layer-specific mapping routines. Depending on the which mapping layer 1525, 1535, 1545, 1555 owns the particular logical object for which mapping is desired, the top-level mapping routine calls one or more of the layer-specific mapping routines 1520, 1530, 1540, 1550 to provide the requested information.

Figure 16:
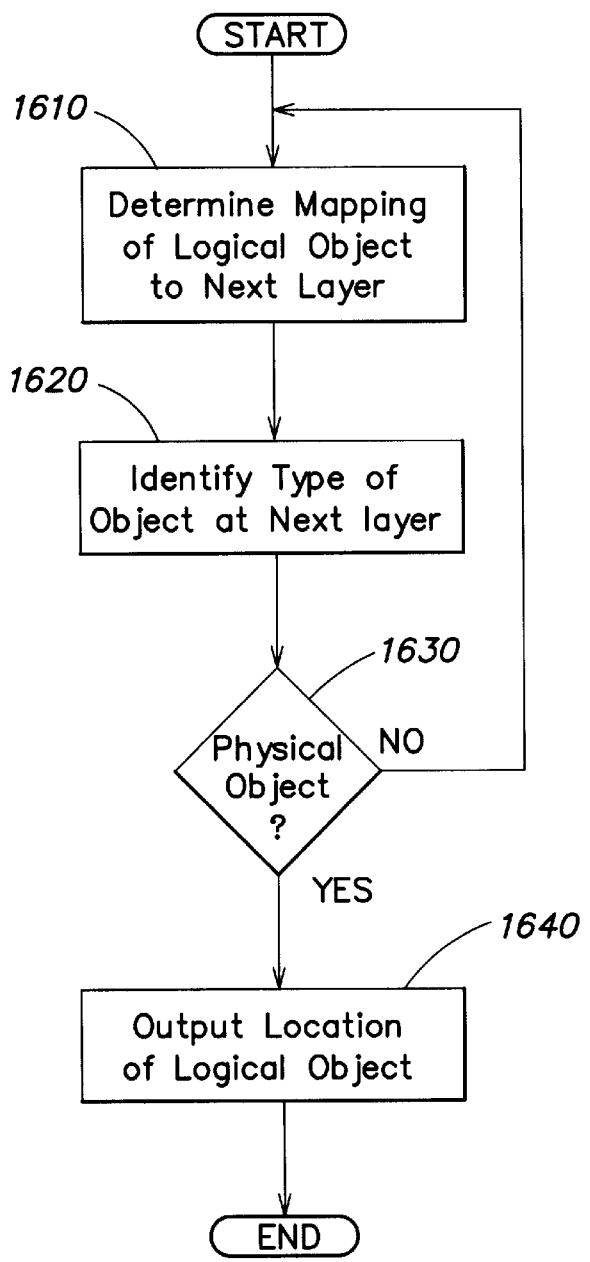
FIG. 16 is a flowchart illustrating the operation of an API according to an embodiment of the present invention.

For example, when information pertaining to the mapping of a particular database object owned by the database mapping layer 1525 is requested, the top-level mapping routine 1570 first calls database mapping routine 1520 (labeled "MAPdb" in FIG. 15) for the specified database object. The information that is returned to the top-level mapping routine 1570 by the database mapping routine 1520 identifies the object to which the database object is mapped at the next lowest layer (e.g, a file in file system 1535). The returned information is then used by the top-level mapping routine 1570 as an argument when calling the mapping routine 1530 for the next lowest mapping layer (i.e., file system 1535). In this manner, the top-level mapping routine 1570 calls each layer-specific mapping routine that is involved in mapping the database object to the locations on the physical storage device that store the database object. Similarly, when information pertaining to the mapping of a particular file object owned by the file system mapping layer 1535 is requested, the top-level mapping routine 1570 first calls the file system mapping routine 1530 (labeled "MAPfs" in FIG. 15), and then calls each layer-specific mapping routine that is involved in mapping that file system object to locations on the physical storage device:

FIG. 16 is an exemplary flowchart of a top-level mapping routine according to one embodiment of the present invention. In the illustrated example of FIG. 16, the application program (e.g., 1510 in FIG. 15) requests the mapping of a database object through four layers of mapping including the database mapping layer 1525, the file system mapping layer 1535, a LVM mapping layer 1545, and an intelligent storage system mapping layer 1555.

The application program calls the top-level mapping routine by issuing a command that requests mapping information for a specified logical object and identifies the type of mapping layer owning the specified logical object. At step 1610, the top-level mapping routine calls the appropriate layer-specific mapping routine for the mapping layer owning the specified logical object. In the present example where the specified logical object is a database object, the top-level mapping routine calls the database mapping routine (e.g., 1520 in FIG. 15). The database mapping routine provides the top-level mapping; routine with an identifier for the database object in the next layer below (i.e., 1535 in FIG. 15).

As a database object can be mapped to either a file in a file system, a logical volume, a raw device or a portion of a raw device (as perceived by the host computer), the top-level mapping routine proceeds to step 1620 to identify the type of storage object (e.g., a file system object, a logical volume object, or a physical device object) that was identified by the database mapping layer. This can be determined by querying the operating system as to whether it is aware of the object identified by the database mapping routine. For example, where the database object is mapped to a file in a file system, the operating system returns the path name for that file and the type of file system (UFS, JFS, etc) that owns that particular file. Next, the routine proceeds to step 1630, wherein the top-level mapping routine determines whether the object to which the specified logical object is mapped is an actual physical device. When it is determined at step 1630 that the object to which the specified logical object is mapped is not a physical device, the routine returns to step 1610 to determine the mapping into the next lowest layer.

In the present example, the database object is mapped to a file in a file system. Accordingly, during the second iteration of step 1610, the top-level mapping routine calls the file system mapping routine (e.g., 1530) to identify the locations at which the file is stored, and then, identifies whether these locations are locations on a logical volume, a raw device, or a portion of a raw device. In this manner the routine iteratively determines the mapping of the specified logical object to the next layer of mapping on the computer system, and the type of object to which it is mapped. When it is determined at step 1630 that the object being processed is mapped to a physical device, the routine proceeds to step 1640.

At step 1640 the routine provides the physical location of the specified logical object to the application program that called the routine in terms of physical blocks of data to which the specified logical object is mapped. After providing this information in step 1640 to the application program calling the routine, the routine then terminates.

In another embodiment of the present invention, the operation of the top-level mapping routine described above can provide the location of the specified object in terms of physical blocks of data as perceived by the host computer, rather than its actual location in physical space. Moreover, according to a further embodiment of the present invention, the top-level mapping routine can provide the location of the specified logical object in physical space in addition to its location as perceived by the host computer.

As should be appreciated from the foregoing, the top-level mapping routine described above is capable of being used with any of the layer-specific mapping routines described herein, including a layer-specific mapping routine that interfaces with a single mapping layer on the computer system, or a layer-specific mapping routine that can interface with two or more different mapping layers of the same type. Moreover, each mapping routine can be implemented in software that is stored on any form of computer readable medium, such as a diskette, a tape, a CD ROM, etc. Alternatively, the software can be copied from the computer readable medium to the host computer 110, where it can be loaded into the memory 130 (FIG. 1) and executed on the processor 120 of the host computer 110.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computer readable medium encoded with a program for execution on a host computer that is coupled to a storage device and includes at least one mapping layer that maps logical objects on the host computer to storage locations on the storage device, the at least one mapping layer including at least one of a file system mapping layer, a logical volume mapping layer, and a database mapping layer, the program, when executed on the host computer, performing a method comprising a step of:

providing an application program that executes on the host computer with information pertaining to a manner in which a logical object is mapped through the at least one mapping layer.

2. The computer readable medium of claim 1, wherein the step of providing includes a step of providing to the application program information identifying a storage location on the storage device to which the logical object is mapped.

3. The computer readable medium of claim 1, wherein the step of providing includes a step of providing to the application program information identifying an organizational structure of the at least one mapping layer through which the logical object is mapped.

4. A computer system comprising:

a host computer;

a storage system that is coupled to the host computer and includes at least one storage device;

at least one mapping layer that is mounted on at least one of the host computer and the storage system that maps logical objects on the host computer to storage locations on the at least one storage device, the at least one mapping layer including at least one of a file system mapping layer, a logical volume mapping layer, and a database mapping layer; and means for providing information pertaining to a manner in which a logical object on the host computer is mapped through the at the at least one mapping layer to an application program that executes on the host computer.

5. The computer system of claim 4, wherein the at least one mapping layer is mounted on the host computer.

6. The computer system of claim 4, wherein the at least one mapping layer is mounted on the storage system.

7. The computer system of claim 4, wherein the at least one mapping layer includes a plurality of mapping layers including a first mapping layer that is mounted on the host computer and a second mapping layer that is mounted on the storage system.

8. In a computer system having a host computer, a storage device and at least one mapping layer that maps logical objects on the host computer to storage locations on the storage device, the at least one mapping layer including at least one of a file system mapping layer, a logical volume mapping layer, and a database mapping layer, a method comprising a step of:

providing to an application program that executes on the host computer information pertaining to a manner in which a logical object is mapped through the at least one, mapping layer.

9. The method of claim 8, wherein the step of providing includes a step of providing to the application program information identifying a storage location on the storage device to which the logical object is mapped.

10. The method of claim 9, wherein the step of providing includes a step of providing to the application program information identifying each storage location on the storage device to which the logical object is mapped.

11. The method of claim 8, wherein the at least one mapping layer includes a plurality of mapping layers, each of the plurality of mapping layers mapping the logical object to at least one location in a next lower mapping layer of the plurality of mapping layers, a lowest mapping layer of the plurality of mapping layers mapping the logical object to at least one storage location on the storage device, and wherein the step of providing includes a step of providing to the application program information identifying the at least one storage location on the storage device to which the logical object is mapped.

12. The method of claim 11, further comprising a step of:

determining which of the plurality of mapping layers are associated with mapping the logical object;

wherein the step of providing includes a step of iteratively mapping the logical object through each of the plurality of mapping layers that are associated with mapping the logical object to identify the at least one storage location on the storage device to which the logical object is mapped.

13. The method of claim 11, wherein the step of providing includes a step of providing to the application program information identifying each of the at least one storage locations on the storage device to which the logical object is mapped.

14. The method of claim 13, wherein:

the computer system includes a storage system that is coupled to the host computer and includes the storage device; and the lowest mapping layer includes a storage system mapping layer that is mounted on the storage system.

15. The method of claim 14, wherein the storage system mapping layer maps storage locations perceived by the computer system as being physical storage locations on the host computer to the storage locations on the storage device, and wherein the step of providing further includes a step of providing to the application program information identifying each of the perceived physical storage locations to which the logical object is mapped.

16. The method of claim 13, further comprising a step of:

determining which of the plurality of mapping layers are associated with mapping the logical object.

17. The method of claim 16, wherein the step of providing to the application program information identifying each of the at least one storage locations on the storage device to which the logical object is mapped includes a step of iteratively mapping the logical object through each of the plurality of mapping layers that are associated with mapping the logical object to identify each of the at least one storage locations on the storage device to which the logical object is mapped.

18. The method of claim 8, wherein the step of providing includes a step of providing to the application program information identifying an organizational structure of the at least one mapping layer through which the logical object is mapped.

19. In a computer system having a host computer, a storage device and at least one mapping layer that maps logical objects on the host computer to storage locations on the storage device, a method comprising a step of:

providing to an application program that executes on the host computer information pertaining to a manner in which a logical object is mapped through the at least one mapping layer;

wherein the at least one mapping layer includes a plurality of mapping layers, each of the plurality of mapping layers mapping the logical object to at least one location in a next lower mapping layer of the plurality of mapping layers, a lowest mapping layer of the plurality of mapping layers mapping the logical object to at least one storage location on the storage device, and wherein the step of providing includes a step of providing to the application program information identifying the at least one storage location on the storage device to which the logical object is mapped;

wherein the step of providing further includes a step of providing to the application program information identifying each of the at least one storage locations on the storage device to which the logical object is mapped;

wherein the logical object is a database object, wherein a first mapping layer of the plurality of mapping layers is a database mapping layer, wherein the lowest mapping layer is a logical volume manager mapping layer, and wherein the step of providing to the application program information identifying each of the at least one storage locations on the storage device to which the logical object is mapped includes steps of:

mapping the database object through the database mapping layer to determine at least one identifier in the logical volume manager mapping layer to which the database object is mapped; and mapping each of the at least one identifiers through the logical volume manager mapping layer to identify each of the at least one storage locations on the storage device to which the database object is mapped.

20. In a computer system having a host computer, a storage device and at least one mapping layer that maps logical objects on the host computer to storage locations on the storage device, a method comprising a step of:

providing to an application program that executes on the host computer information pertaining to a manner in which a logical object is mapped through the at least one mapping layer;

wherein the at least one mapping layer includes a plurality of mapping layers, each of the plurality of mapping layers mapping the logical object to at least one location in a next lower mapping layer of the plurality of mapping layers, a lowest mapping layer of the plurality of mapping layers mapping the logical object to at least one storage location on the storage device, and wherein the step of providing includes a step of providing to the application program information identifying the at least one storage location on the storage device to which the logical object is mapped;

wherein the step of providing further includes a step of providing to the application program information identifying each of the at least one storage locations on the storage device to which the logical object is mapped;

wherein the logical object is a database object, wherein a first mapping layer of the plurality of mapping layers is a database mapping layer, wherein the next mapping layer is a file system mapping layer, wherein the lowest mapping layer is a logical volume manager mapping layer, and wherein the step of providing to the application program information identifying each of the at least one storage locations on the storage device to which the logical object is mapped includes steps of:

mapping the database object through the database mapping layer to determine a file to which the database object is mapped;

mapping the file through the file system mapping layer to determine at least one identifier in the logical volume manager mapping layer to which the file is mapped; and mapping each of the at least one identifiers through the logical volume manager mapping layer to identify each of the at least one storage locations on the storage device to which the database object is mapped.

21. In a computer system having a host computer, a storage device and at least one mapping layer that maps logical objects on the host computer to storage locations on the storage device, a method comprising a step of:

providing to an application program that executes on the host computer information pertaining to a manner in which a logical object is mapped through the at least one mapping layer;

wherein the at least one mapping layer includes a plurality of mapping layers, each of the plurality of mapping layers mapping the logical object to at least one location in a next lower mapping layer of the plurality of mapping layers, a lowest mapping layer of the plurality of mapping layers mapping the logical object to at least one storage location on the storage device, and wherein the step of providing includes a step of providing to the application program information identifying the at least one storage location on the storage device to which the logical object is mapped;

wherein the step of providing further includes a step of providing to the application program information identifying each of the at least one storage locations on the storage device to which the logical object is mapped;

wherein the logical object is a file, wherein a first mapping layer of the plurality of mapping layers is a file system mapping layer, wherein the lowest mapping layer is a logical volume manager mapping layer, and wherein the step of providing to the application program information identifying each of the at least one storage locations on the storage device to which the logical object is mapped includes steps of:

mapping the file through the file system mapping layer to determine at least one identifier in the logical volume manager mapping layer to which the file is mapped; and mapping each of the at least one identifiers through the logical volume manager mapping layer to identify each of the at least one storage locations on the storage device to which the file is mapped.

* * * * *